(12) United States Patent
Wang et al.

(10) Patent No.: US 10,779,310 B2
(45) Date of Patent: Sep. 15, 2020

(54) UPLINK CONTROL CHANNEL RESOURCE ALLOCATION FOR NEW RADIO (NR)

(71) Applicant: QUALCOMM Incorporated, San Diego, CA (US)

(72) Inventors: Renqiu Wang, San Diego, CA (US); Yi Huang, San Diego, CA (US); Wanshi Chen, San Diego, CA (US); Xiao Feng Wang, San Diego, CA (US); Peter Gaal, San Diego, CA (US); Tao Luo, San Diego, CA (US); Sony Akkarakaran, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 16 days.

(21) Appl. No.: 16/188,912

(22) Filed: Nov. 13, 2018

(65) Prior Publication Data
US 2019/0150169 A1 May 16, 2019

Related U.S. Application Data

(60) Provisional application No. 62/587,464, filed on Nov. 16, 2017.

(51) Int. Cl.
*H04W 72/12* (2009.01)
*H04L 5/00* (2006.01)
(Continued)

(52) U.S. Cl.
CPC ...... *H04W 72/1263* (2013.01); *H04B 7/0617* (2013.01); *H04B 7/0626* (2013.01);
(Continued)

(58) Field of Classification Search
CPC .............. H04L 5/0053; H04L 5/0055; H04W 72/1263; H04W 72/1268; H04W 76/27
See application file for complete search history.

(56) References Cited

U.S. PATENT DOCUMENTS

2013/0336177 A1* 12/2013 Gao ................. H04L 5/1476
370/280
2016/0242169 A1* 8/2016 Park ................. H04L 1/1812
(Continued)

OTHER PUBLICATIONS

Samsung; "Resource Allocation for PUCCH with HARQ-ACK"; 3GPP TSG RAN WG1 NR Ad-Hoc#2 Qingdao, P.R. China Jun. 27-30, 2017; R1-1710709 (Year: 2017).*

(Continued)

*Primary Examiner* — Gary Mui
(74) *Attorney, Agent, or Firm* — Holland & Hart LLP

(57) ABSTRACT

Methods, systems, and devices for wireless communications are described. In some systems (e.g., new radio (NR) wireless communications systems), a base station may serve a large number of user equipment (UEs). The base station may allocate uplink control channel resources to the UEs using a limited number of bits by implementing explicit and implicit resource mapping. Explicit mapping may involve determining certain indicated resources based on a received set of bits, and implicit mapping may involve determining a resource indication from a characteristic of a transmission (e.g., a starting control channel element (CCE) for a downlink control information (DCI) transmission). A UE may determine an allocated uplink control channel resource for transmission based on the combination of the two types of indications. Additionally, the UE may implement one or more techniques for handling colliding resource allocations (e.g., acknowledgement (ACK), channel quality indicator (CQI), or scheduling request (SR) resource allocations).

86 Claims, 17 Drawing Sheets

(51) Int. Cl.
*H04W 16/14* (2009.01)
*H04B 7/06* (2006.01)
*H04W 76/27* (2018.01)
*H04B 7/0413* (2017.01)
*H04W 72/04* (2009.01)

(52) U.S. Cl.
CPC .......... *H04L 5/0053* (2013.01); *H04L 5/0055* (2013.01); *H04W 16/14* (2013.01); *H04W 72/1268* (2013.01); *H04W 76/27* (2018.02); *H04B 7/0413* (2013.01); *H04L 5/0057* (2013.01); *H04W 72/0406* (2013.01)

(56) References Cited

U.S. PATENT DOCUMENTS

2017/0265207 A1* 9/2017 Takeda .................. H04L 5/0055
2018/0048165 A1* 2/2018 Shiraishi ............. H01M 10/482
2018/0376464 A1* 12/2018 Hosseini ............... H04L 1/1887
2019/0045499 A1* 2/2019 Huang ............. H04W 72/0446
2019/0081763 A1* 3/2019 Akkarakaran ........ H04L 1/1812
2019/0124647 A1* 4/2019 Li ........................ H04L 5/0044

OTHER PUBLICATIONS

International Search Report and Written Opinion—PCT/US2018/061051—ISA/EPO—dated May 21, 2019.
Partial International Search Report—PCT/US2018/061051—ISA/EPO —dated Mar. 28, 2019.
Qualcomm Incorporated: "Resource Allocation for PUCCH", 3GPP Draft; R1-1711194 Resource Allocation for PUCCH, 3rd Generation Partnership Project (3GPP), Mobile Competence Centre; 650, Route Des Lucioles; F-06921 Sophia-Antipolis Cedex; France, vol. RAN WG1, No. Qingdao, China; Jun. 27, 2017-Jun. 30, 2017 Jun. 26, 2017, XP051300393, Retrieved from the Internet: URL:http://www.3gpp.org/ftp/Meetings_3GPP_SYNC/RAN1/Docs/ [retrieved on Jun. 26, 2017], 4 pages.

* cited by examiner

UPLINK CONTROL CHANNEL RESOURCE ALLOCATION FOR NEW RADIO (NR)

CROSS REFERENCES

The present Application for Patent claims the benefit of U.S. Provisional Patent Application No. 62/587,464 by Wang, et al., entitled "UPLINK CONTROL CHANNEL RESOURCE ALLOCATION FOR NEW RADIO (NR)," filed Nov. 16, 2017, assigned to the assignee hereof, and expressly incorporated by reference herein.

BACKGROUND

The following relates generally to wireless communication, and more specifically to uplink control channel resource allocation for new radio (NR).

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as a Long-Term Evolution (LTE) systems or LTE-Advanced (LTE-A) systems, and fifth generation (5G) systems which may be referred to as NR systems. These systems may employ technologies such as code division multiple access (CDMA), time division multiple access (TDMA), frequency division multiple access (FDMA), orthogonal frequency division multiple access (OFDMA), or discrete Fourier transform-spread-orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some wireless communications systems (e.g., NR systems), a base station may serve a large number (e.g., hundreds) of UEs. This large number of UEs operating within the system may result in collisions of assigned resources. Additionally, the base station may utilize a fixed number of bits to indicate resource assignments, limiting the number of resources that can be indicated to UEs.

SUMMARY

The described techniques relate to improved methods, systems, devices, or apparatuses that support uplink control channel resource allocation for new radio (NR) systems. Generally, the described techniques provide for allocating uplink control channel resources using explicit resource mapping, implicit resource mapping, or both to reduce or avoid collisions of allocated resources. Additionally, the described techniques may provide for handling resource collisions that occur and determining acknowledgement (ACK) payload sizes for transmission. In some systems (e.g., NR wireless communications systems), a base station may serve a large number of user equipment (UEs). The base station may allocate uplink control channel resources to the UEs using a limited number of bits by implementing explicit and implicit resource mapping. Explicit mapping may involve determining certain indicated resources based on a received set of bits, and implicit mapping may involve determining a resource indication from a characteristic of a transmission (e.g., a starting control channel element (CCE) for a downlink control information (DCI) transmission). A UE may determine an allocated uplink control channel resource for transmission based on the combination of the two types of indications. In some cases, along with indicating the uplink control channel resources for the UE, the base station may indicate an ACK payload size for the UE to use for ACK transmissions. Additionally or alternatively, the UE may implement one or more techniques for handling colliding resource allocations (e.g., ACK resource allocations, channel quality indicator (CQI) resource allocations, scheduling request (SR) resource allocations, or any other type of resource allocations).

A method of wireless communication is described. The method may include receiving a set of resource indicator bits in one or more CCEs, determining that possible bit combinations for the set of resource indicator bits is less than available uplink control channel resources, and identifying a first CCE of the one or more CCEs based at least in part on the determining. The method may further include selecting an uplink control channel resource for uplink control information (UCI) transmission based at least in part on the set of resource indicator bits and the first CCE of the one or more CCEs, and transmitting the UCI using the selected uplink control channel resource.

An apparatus for wireless communication is described. The apparatus may include means for receiving a set of resource indicator bits in one or more CCEs, means for determining that possible bit combinations for the set of resource indicator bits is less than available uplink control channel resources, and means for identifying a first CCE of the one or more CCEs based at least in part on the determining. The apparatus may further include means for selecting an uplink control channel resource for UCI transmission based at least in part on the set of resource indicator bits and the first CCE of the one or more CCEs and means for transmitting the UCI using the selected uplink control channel resource.

Another apparatus for wireless communication is described. The apparatus may include a processor, memory in electronic communication with the processor, and instructions stored in the memory. The instructions may be operable to cause the processor to receive a set of resource indicator bits in one or more CCEs, determine that possible bit combinations for the set of resource indicator bits is less than available uplink control channel resources, and identify a first CCE of the one or more CCEs based at least in part on the determining. The instructions may be further operable by the processor to select an uplink control channel resource for UCI transmission based at least in part on the set of resource indicator bits and the first CCE of the one or more CCEs, and transmit the UCI using the selected uplink control channel resource.

A non-transitory computer-readable medium for wireless communication is described. The non-transitory computer-readable medium may include instructions operable to cause a processor to receive a set of resource indicator bits in one or more CCEs, determine that possible bit combinations for the set of resource indicator bits is less than available uplink control channel resources, and identify a first CCE of the one or more CCEs based at least in part on the determining. The instructions may be further operable by the processor to select an uplink control channel resource for UCI transmission based at least in part on the set of resource indicator bits and the first CCE of the one or more CCEs, and transmit the UCI using the selected uplink control channel resource.

In some examples of the method, apparatus, and non-transitory computer-readable medium described above, selecting the uplink control channel resource involves determining an uplink control channel resource set based at least in part on the set of resource indicator bits. Some examples of the method, apparatus, and non-transitory computer-readable medium described above may further include processes, features, means, or instructions for determining a relative uplink control channel resource index based at least in part on the first CCE, where the selected uplink control channel resource corresponds to the relative uplink control channel resource index within the uplink control channel resource set.

In some examples of the method, apparatus, and non-transitory computer-readable medium described above, selecting the uplink control channel resource involves determining an uplink control channel resource set based at least in part on the first CCE. Some examples of the method, apparatus, and non-transitory computer-readable medium described above may further include processes, features, means, or instructions for determining a relative uplink control channel resource index based at least in part on the set of resource indicator bits, where the selected uplink control channel resource corresponds to the relative uplink control channel resource index within the uplink control channel resource set.

In some examples of the method, apparatus, and non-transitory computer-readable medium described above, selecting the uplink control channel resource involves determining an offset value based at least in part on the set of resource indicator bits. Some examples of the method, apparatus, and non-transitory computer-readable medium described above may further include processes, features, means, or instructions for selecting the uplink control channel resource based at least in part on a combination of the first CCE and the determined offset value.

In some examples of the method, apparatus, and non-transitory computer-readable medium described above, selecting the uplink control channel resource may be further based at least in part on an aggregation level.

Some examples of the method, apparatus, and non-transitory computer-readable medium described above may further include processes, features, means, or instructions for comparing uplink control channel resource indices within an uplink control channel resource set to a threshold of resources. Some examples of the method, apparatus, and non-transitory computer-readable medium described above may further include processes, features, means, or instructions for determining to select the uplink control channel resource based at least in part on an aggregation level if the uplink control channel resource indices within the uplink control channel resource set may be less than the threshold of resources.

In some examples of the method, apparatus, and non-transitory computer-readable medium described above, the UCI includes ACK bits according to an ACK payload size.

In some examples of the method, apparatus, and non-transitory computer-readable medium described above, the ACK payload size is an example of a radio resource control (RRC) configured ACK payload size.

Some examples of the method, apparatus, and non-transitory computer-readable medium described above may further include processes, features, means, or instructions for receiving a number of downlink shared channels that may be less than the ACK bits according to the RRC configured ACK payload size. Some examples of the method, apparatus, and non-transitory computer-readable medium described above may further include processes, features, means, or instructions for inserting ACK bits of a bit value corresponding to decoded results of the downlink shared channels into an ACK payload. Some examples of the method, apparatus, and non-transitory computer-readable medium described above may further include processes, features, means, or instructions for inserting ACK bits of a default bit value corresponding to non-received downlink shared channels into the ACK payload to obtain the RRC configured ACK payload size.

Some examples of the method, apparatus, and non-transitory computer-readable medium described above may further include processes, features, means, or instructions for receiving an assignment index bit in DCI. Some examples of the method, apparatus, and non-transitory computer-readable medium described above may further include processes, features, means, or instructions for determining the ACK payload size based at least in part on the assignment index bit.

Some examples of the method, apparatus, and non-transitory computer-readable medium described above may further include processes, features, means, or instructions for receiving a set of assignment index bits in DCI. Some examples of the method, apparatus, and non-transitory computer-readable medium described above may further include processes, features, means, or instructions for determining the ACK payload size based at least in part on the set of assignment index bits. In some examples of the method, apparatus, and non-transitory computer-readable medium described above, the DCI includes a number of assignment index bits based at least in part on a format of the DCI. For example, in some examples of the method, apparatus, and non-transitory computer-readable medium described above, a full DCI format corresponds to a first number of assignment index bits and a fallback DCI format corresponds to a second number of assignment index bits that is less than the first number of assignment index bits.

Some examples of the method, apparatus, and non-transitory computer-readable medium described above may further include processes, features, means, or instructions for receiving a first downlink control channel transmission in a first transmission time interval (TTI), a second downlink control channel transmission in a second TTI, or both. Some examples of the method, apparatus, and non-transitory computer-readable medium described above may further include processes, features, means, or instructions for determining the ACK payload size, ACK bit resources, or both based at least in part on receiving the first downlink control channel transmission, the second downlink control channel transmission, or both.

In some examples of the method, apparatus, and non-transitory computer-readable medium described above, the UCI may be transmitted in either a short uplink control channel transmission or a long uplink control channel transmission according to an RRC configuration.

Some examples of the method, apparatus, and non-transitory computer-readable medium described above may further include processes, features, means, or instructions for determining to transmit the UCI in either a short uplink control channel transmission or a long uplink control channel transmission based at least in part on the set of resource indicator bits.

Some examples of the method, apparatus, and non-transitory computer-readable medium described above may further include processes, features, means, or instructions for receiving a second set of resource indicator bits in a second set of CCEs. Some examples of the method, apparatus, and non-transitory computer-readable medium described above may further include processes, features, means, or instructions for determining that updated possible bit combinations for the second set of resource indicator bits may be equal to or greater than updated available uplink control channel resources. Some examples of the method, apparatus, and non-transitory computer-readable medium described above may further include processes, features, means, or instructions for selecting a second uplink control channel resource for a second UCI transmission based at least in part on the second set of resource indicator bits, where selecting the second uplink control channel resource may be not based at least in part on a first CCE of the second set of CCEs according to determining that the updated possible bit combinations for the second set of resource indicator bits may be equal to or greater than the updated available uplink control channel resources.

Some examples of the method, apparatus, and non-transitory computer-readable medium described above may further include processes, features, means, or instructions for receiving additional downlink control information in a second set of CCEs. Some examples of the method, apparatus, and non-transitory computer-readable medium described above may further include processes, features, means, or instructions for determining that the additional downlink control information includes fewer resource indicator bits than a threshold of bits. Some examples of the method, apparatus, and non-transitory computer-readable medium described above may further include processes, features, means, or instructions for selecting a second uplink control channel resource for a second UCI transmission based at least in part on a CCE of the second set of CCEs, where selecting the second uplink control channel resource may be based at least in part on determining that the additional downlink control information includes fewer resource indicator bits than the threshold of bits. Some examples of the method, apparatus, and non-transitory computer-readable medium described above may further include processes, features, means, or instructions for transmitting the second UCI using the selected second uplink control channel resource.

In some examples of the method, apparatus, and non-transitory computer-readable medium described above, the additional downlink control information includes zero resource indicator bits. In some examples of the method, apparatus, and non-transitory computer-readable medium described above, the second UCI may be transmitted in either a short uplink control channel transmission or a long uplink control channel transmission according to an RRC configuration.

In some examples of the method, apparatus, and non-transitory computer-readable medium described above, the additional downlink control information includes at least one resource indicator bit. In some examples of the method, apparatus, and non-transitory computer-readable medium described above, the second UCI may be transmitted in either a short uplink control channel transmission or a long uplink control channel transmission based at least in part on the at least one resource indicator bit.

In some examples of the method, apparatus, and non-transitory computer-readable medium described above, the set of resource indicator bits may be received in a downlink grant or an uplink grant. In some examples of the method, apparatus, and non-transitory computer-readable medium described above, the first CCE of the one or more CCEs is an example of an initial CCE for the downlink grant or the uplink grant.

In some examples of the method, apparatus, and non-transitory computer-readable medium described above, the uplink control channel resource is an example of a physical uplink control channel (PUCCH) resource. In some examples of the method, apparatus, and non-transitory computer-readable medium described above, the set of resource indicator bits includes a set of acknowledgement resource indicator (ARI) bits.

A method of wireless communication is described. The method may include identifying an uplink control channel resource for allocation, determining a set of resource indicator bits based at least in part on the identified uplink control channel resource, selecting one or more CCEs for transmission, where a first CCE of the one or more CCEs and the set of resource indicator bits indicate the uplink control channel resource, and transmitting the set of resource indicator bits in the one or more CCEs.

An apparatus for wireless communication is described. The apparatus may include means for identifying an uplink control channel resource for allocation, means for determining a set of resource indicator bits based at least in part on the identified uplink control channel resource, means for selecting one or more CCEs for transmission, where a first CCE of the one or more CCEs and the set of resource indicator bits indicate the uplink control channel resource, and means for transmitting the set of resource indicator bits in the one or more CCEs.

Another apparatus for wireless communication is described. The apparatus may include a processor, memory in electronic communication with the processor, and instructions stored in the memory. The instructions may be operable to cause the processor to identify an uplink control channel resource for allocation, determine a set of resource indicator bits based at least in part on the identified uplink control channel resource, select one or more CCEs for transmission, where a first CCE of the one or more CCEs and the set of resource indicator bits indicate the uplink control channel resource, and transmit the set of resource indicator bits in the one or more CCEs.

A non-transitory computer-readable medium for wireless communication is described. The non-transitory computer-readable medium may include instructions operable to cause a processor to identify an uplink control channel resource for allocation, determine a set of resource indicator bits based at least in part on the identified uplink control channel resource, select one or more CCEs for transmission, where a first CCE of the one or more CCEs and the set of resource indicator bits indicate the uplink control channel resource, and transmit the set of resource indicator bits in the one or more CCEs.

In some examples of the method, apparatus, and non-transitory computer-readable medium described above, the set of resource indicator bits indicates an uplink control channel resource set, and the first CCE indicates a relative uplink control channel resource index within the uplink control channel resource set.

In some examples of the method, apparatus, and non-transitory computer-readable medium described above, the first CCE indicates an uplink control channel resource set, and the set of resource indicator bits indicates a relative uplink control channel resource index within the uplink control channel resource set.

In some examples of the method, apparatus, and non-transitory computer-readable medium described above, the set of resource indicator bits indicates an offset value, and a combination of the first CCE and the offset value indicates the uplink control channel resource.

Some examples of the method, apparatus, and non-transitory computer-readable medium described above may further include processes, features, means, or instructions for selecting an aggregation level, where the aggregation level, the first CCE of the one or more CCEs, and the set of resource indicator bits indicate the uplink control channel resource. Some examples of the method, apparatus, and non-transitory computer-readable medium described above may further include processes, features, means, or instructions for transmitting the set of resource indicator bits in the one or more CCEs based at least in part on the selected aggregation level.

Some examples of the method, apparatus, and non-transitory computer-readable medium described above may further include processes, features, means, or instructions for receiving UCI over the uplink control channel resource, where the UCI includes an ACK payload.

Some examples of the method, apparatus, and non-transitory computer-readable medium described above may further include processes, features, means, or instructions for performing a blind detection process on one or more uplink control channel resources, where the UCI may be received based at least in part on the blind detection process.

Some examples of the method, apparatus, and non-transitory computer-readable medium described above may further include processes, features, means, or instructions for transmitting a set of assignment index bits in DCI, where the set of assignment index bits indicates an ACK payload size.

In some examples of the method, apparatus, and non-transitory computer-readable medium described above, a format of the DCI indicates a number of assignment index bits to include in the set of assignment index bits. For example, in some examples of the method, apparatus, and non-transitory computer-readable medium described above, a full DCI format indicates a first number of assignment index bits to include in the set of assignment index bits and a fallback DCI format indicates a second number of assignment index bits to include in the set of assignment index bits, where the second number of assignment index bits is less than the first number of assignment index bits.

Some examples of the method, apparatus, and non-transitory computer-readable medium described above may further include processes, features, means, or instructions for selecting either a short uplink control channel transmission or a long uplink control channel transmission for the allocation. Some examples of the method, apparatus, and non-transitory computer-readable medium described above may further include processes, features, means, or instructions for determining the set of resource indicator bits further based at least in part on the selected short uplink control channel transmission or long uplink control channel transmission.

Some examples of the method, apparatus, and non-transitory computer-readable medium described above may further include processes, features, means, or instructions for identifying a second uplink control channel resource for allocation.

Some examples of the method, apparatus, and non-transitory computer-readable medium described above may further include processes, features, means, or instructions for determining a second set of resource indicator bits based at least in part on the identified second uplink control channel resource, where the second set of resource indicator bits indicates the second uplink control channel resource.

Some examples of the method, apparatus, and non-transitory computer-readable medium described above may further include processes, features, means, or instructions for selecting a second set of CCEs for transmission, where a CCE of the second set of CCEs indicates the second uplink control channel resource.

Some examples of the method, apparatus, and non-transitory computer-readable medium described above may further include processes, features, means, or instructions for determining at least one resource indicator bit, where at least one resource indicator bit indicates either a short uplink control channel transmission or a long uplink control channel transmission for the second uplink control channel resource.

In some examples of the method, apparatus, and non-transitory computer-readable medium described above, the set of resource indicator bits may be transmitted in a downlink grant or an uplink grant. In some examples of the method, apparatus, and non-transitory computer-readable medium described above, the first CCE of the one or more CCEs is an example of an initial CCE for the downlink grant or the uplink grant.

In some examples of the method, apparatus, and non-transitory computer-readable medium described above, the uplink control channel resource is an example of a PUCCH resource. In some examples of the method, apparatus, and non-transitory computer-readable medium described above, the set of resource indicator bits includes a set of ARI bits.

A method of wireless communication is described. The method may include receiving a first resource assignment for a first set of symbols; receiving a second resource assignment for a second set of symbols, where the first set of symbols and the second set of symbols include an overlapping set of symbols; modifying first resources for the first resource assignment, second resources for the second resource assignment, or both; and transmitting first information based at least in part on the first resource assignment.

An apparatus for wireless communication is described. The apparatus may include means for receiving a first resource assignment for a first set of symbols; means for receiving a second resource assignment for a second set of symbols, where the first set of symbols and the second set of symbols include an overlapping set of symbols; means for modifying first resources for the first resource assignment, second resources for the second resource assignment, or both; and means for transmitting first information based at least in part on the first resource assignment.

Another apparatus for wireless communication is described. The apparatus may include a processor, memory in electronic communication with the processor, and instructions stored in the memory. The instructions may be operable to cause the processor to receive a first resource assignment for a first set of symbols; receive a second resource assignment for a second set of symbols, where the first set of symbols and the second set of symbols include an overlapping set of symbols; modify first resources for the first resource assignment, second resources for the second resource assignment, or both; and transmit first information based at least in part on the first resource assignment.

A non-transitory computer-readable medium for wireless communication is described. The non-transitory computer-readable medium may include instructions operable to cause a processor to receive a first resource assignment for a first set of symbols; receive a second resource assignment for a second set of symbols, where the first set of symbols and the second set of symbols include an overlapping set of symbols; modify first resources for the first resource assignment, second resources for the second resource assignment, or both; and transmit first information based at least in part on the first resource assignment.

Some examples of the method, apparatus, and non-transitory computer-readable medium described above may further include processes, features, means, or instructions for performing joint-encoding of the first information with second information associated with the second resource assignment. Some examples of the method, apparatus, and non-transitory computer-readable medium described above may further include processes, features, means, or instructions for transmitting the joint-encoded first information and second information. In some examples of the method, apparatus, and non-transitory computer-readable medium described above, the joint-encoded first information and second information may be transmitted in the first resources for the first resource assignment.

Some examples of the method, apparatus, and non-transitory computer-readable medium described above may further include processes, features, means, or instructions for assigning each symbol of the overlapping set of symbols to either the first resources for the first resource assignment or the second resources for the second resource assignment. Some examples of the method, apparatus, and non-transitory computer-readable medium described above may further include processes, features, means, or instructions for transmitting second information associated with the second resource assignment based at least in part on the assigning.

Some examples of the method, apparatus, and non-transitory computer-readable medium described above may further include processes, features, means, or instructions for avoiding a transmission of second information associated with the second resource assignment based at least in part on the overlapping set of symbols.

Some examples of the method, apparatus, and non-transitory computer-readable medium described above may further include processes, features, means, or instructions for receiving a third resource assignment for a third set of symbols, where the third set of symbols includes at least a portion of the overlapping set of symbols. Some examples of the method, apparatus, and non-transitory computer-readable medium described above may further include processes, features, means, or instructions for performing joint-encoding of the first information with second information associated with the second resource assignment. Some examples of the method, apparatus, and non-transitory computer-readable medium described above may further include processes, features, means, or instructions for transmitting the joint-encoded first information and second information in the first resources for the first resource assignment. Some examples of the method, apparatus, and non-transitory computer-readable medium described above may further include processes, features, means, or instructions for transmitting third information associated with the third resource assignment based at least in part on the third resource assignment.

In some examples of the method, apparatus, and non-transitory computer-readable medium described above, the first resource assignment and the second resource assignment correspond to different length resource assignments.

In some examples of the method, apparatus, and non-transitory computer-readable medium described above, the first resource assignment, the second resource assignment, or both are examples of an ACK resource assignment, an SR resource assignment, a CQI resource assignment, a channel state information (CSI) resource assignment, or a combination thereof.

DETAILED DESCRIPTION

Figure 1:
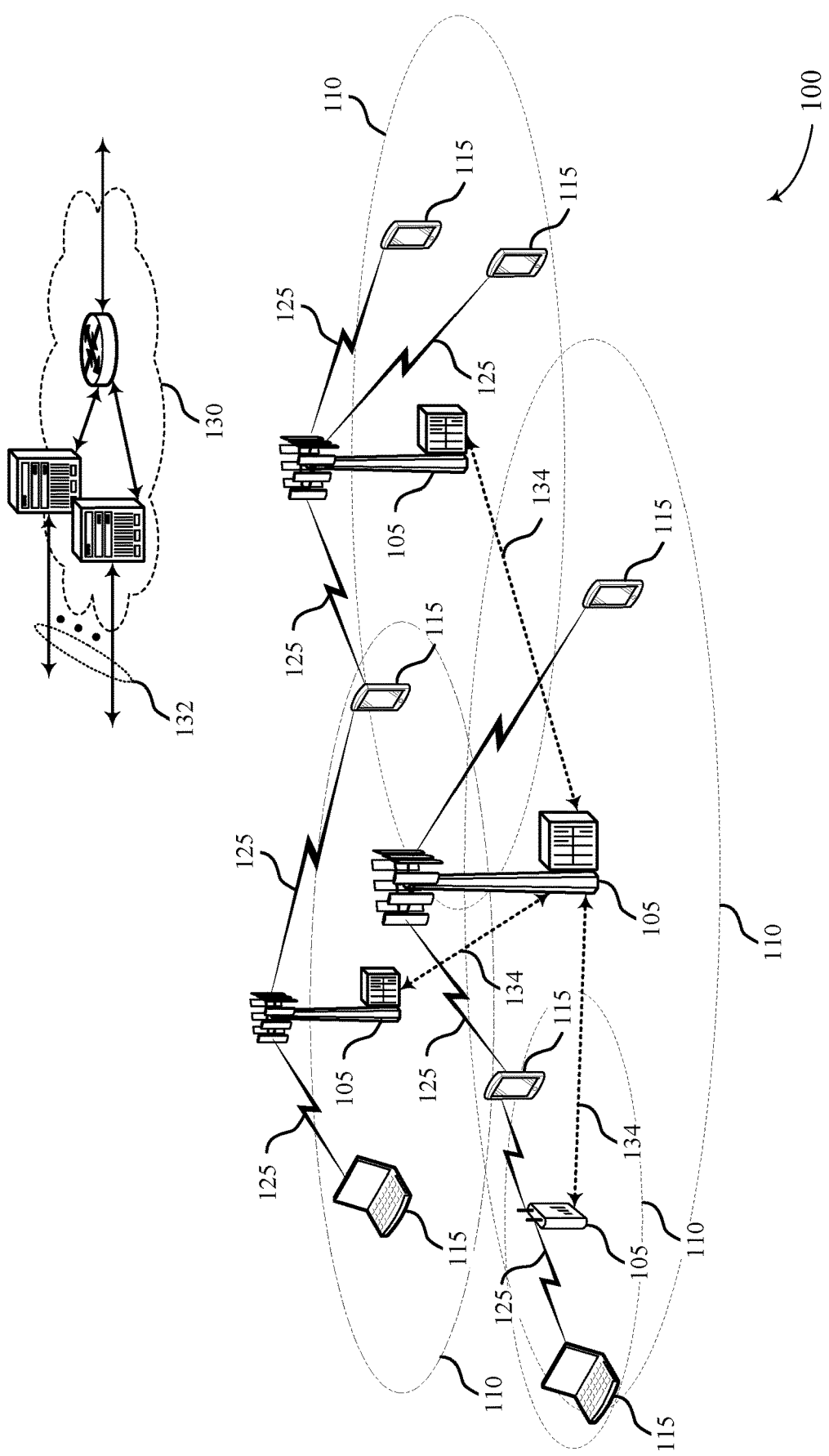
FIG. 1 illustrates an example of a system for wireless communication that supports uplink control channel resource allocation for new radio (NR) in accordance with aspects of the present disclosure.

In some wireless communications systems (e.g., new radio (NR) systems), a base station may serve a large number of user equipment (UEs). The base station may allocate uplink control channel resources (e.g., physical uplink control channel (PUCCH) resources) to these UEs using a set of resource indicator bits, where each UE may include a set of available resources for uplink control channel transmission. To reduce the probability of collisions between assigned resources for this large number of UEs, the system may implement a large number of both total resources and resources per UE. In some cases, the amount of resources may be too large to indicate with the set of resource indicator bits (e.g., if the number of different resources to indicate is greater than the possible bit combinations for the indicator bits).

In these cases, the base station may allocate uplink control channel resources to the UEs using the limited number of bits by implementing explicit and implicit resource mapping. In explicit resource mapping, the base station may set bit values within a transmission to indicate one or more uplink control channel resources. In implicit resource mapping, the base station may set a parameter of the transmission to indicate one or more resources. For example, the base station may transmit a downlink control information (DCI) transmission within a set of control channel elements (CCEs), where the index of the starting CCE of the set may indicate uplink control channel resources (e.g., based on an implicit mapping function). A UE receiving the DCI transmission may determine the allocated uplink control channel resource based on the combination of the explicit set of bits and the implicit CCE index. The UE may transmit uplink control information (UCI) on the determined resource.

In some cases, despite implementing this large set of resources, a UE may be assigned colliding resource allocations (e.g., acknowledgement (ACK) resource allocations, channel quality indicator (CQI) resource allocations, scheduling request (SR) resource allocations, or any other type of resource allocations). The UE may implement one or more techniques for efficiently handling these colliding resource allocations. For example, the UE may implement joint-encoding, overlapping resource splitting, or dropping of one or more of the colliding allocated transmissions. The UE may also semi-statically or dynamically determine an ACK payload size or an uplink control channel transmission duration based on a configuration of the UE or based on received DCI from the base station.

Aspects of the disclosure are initially described in the context of a wireless communications systems. Additional aspects are described with reference to uplink control channel resource mapping, resource collision scenarios, and process flows. Aspects of the disclosure are further illustrated by and described with reference to apparatus diagrams, system diagrams, and flowcharts that relate to uplink control channel resource allocation.

FIG. 1 illustrates an example of a wireless communications system 100 that supports uplink control channel resource allocation for NR in accordance with various aspects of the present disclosure. The wireless communications system 100 includes base stations 105, UEs 115, and a core network 130. In some examples, the wireless communications system 100 may be a Long-Term Evolution (LTE) network, an LTE-Advanced (LTE-A) network, or a NR network. In some cases, wireless communications system 100 may support enhanced broadband communications, ultra-reliable (e.g., mission critical) communications, low latency communications, or communications with low-cost and low-complexity devices. In some cases (e.g., for an NR wireless communications system), base stations 105 may utilize one or more techniques for allocating uplink control channel resources for UEs 115.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap and overlapping geographic coverage areas 110 associated with different technologies may be supported by the same base station 105 or by different base stations 105. The wireless communications system 100 may include, for example, a heterogeneous LTE/LTE-A or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or another interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation (CA) configuration in conjunction with component carriers (CCs) operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100 and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected CCs using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an Evolved Universal Terrestrial Radio Access (UTRA) absolute radio frequency channel number (EARFCN)) and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple subcarriers (e.g., using multi-carrier modulation (MCM) techniques such as orthogonal frequency division multiplexing (OFDM) or discrete Fourier transform-spread-OFDM (DFT-s-OFDM)).

The organizational structure of the carriers may be different for different radio access technologies (e.g., LTE, LTE-A, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or resource blocks (RBs)) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth or may be configurable to support communications over one of a set of carrier bandwidths. In some examples, the wireless communications system 100 may include base stations 105 and/or UEs that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

Figure 2:
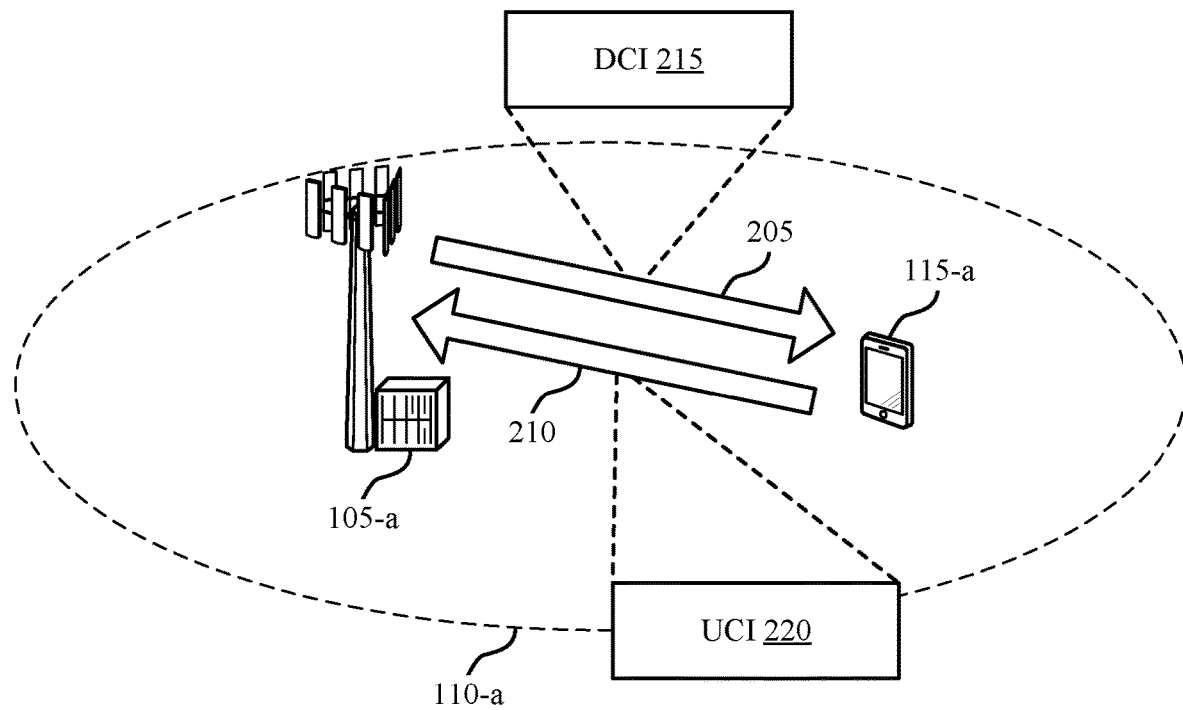
FIG. 2 illustrates an example of a wireless communications system in accordance with aspects of the present disclosure.

FIG. 2 illustrates an example of a wireless communications system 200 in accordance with aspects of the present disclosure. The wireless communications system 200 may include base station 105-a serving geographic coverage area 110-a, and UE 115-a. These may be examples of the corresponding components discussed above, for example, with reference to FIG. 1. Base station 105-a may transmit information to UE 115-a over a downlink channel 205, and UE 115-a may transmit information to base station 105-a over an uplink channel 210. For example, the downlink channel 205 may be an example of a downlink control channel, such as a physical downlink control channel (PDCCH). Similarly, the uplink channel 210 may be an example of an uplink control channel, such as a PUCCH. In some systems, base station 105-a may utilize DCI 215 to allocate resources for UE 115-a to transmit UCI 220.

Base station 105-a may transmit uplink control channel resource mapping information within the DCI 215 to UE 115-a. This resource mapping information may include explicit indications of resources (e.g., using one or more bits specifically configured for indicating uplink control channel resources), implicit indications of resources (e.g., where one or more characteristics of the DCI 215 indicates uplink control channel resources), or a combination of the two (e.g., where characteristics of the DCI 215 are used to indicate resources of a semi-statically configured ACK payload). Example explicit and implicit uplink control channel resource mapping techniques are described below, for example, with reference to FIG. 3. In some cases, despite these resource mapping techniques, UE 115-a may be assigned colliding resource allocations. UE 115-a may implement one or more techniques for handling resource collisions as described below, for example, with reference to FIGS. 4A, 4B, and 4C.

Additionally or alternatively to determining allocated uplink control channel resources and avoiding resource collisions, UE 115-a may determine an ACK payload size for transmission. For example, UE 115-a may include an ACK payload in the UCI 220 transmitted to base station 105-a (e.g., to acknowledge successful or unsuccessful receipt of one or more downlink control channel transmissions).

In a first implementation, UE 115-a may be semi-statically configured (e.g., by RRC) with a set ACK payload size (e.g., a number of HARQ-ACK information bits). For example, UE 115-a may operate according to this first implementation if UE 115-a is configured with a semi-static physical downlink shared channels (PDSCH) HARQ-ACK codebook. When UE 115-a receives downlink transmissions from base station 105-a, UE 115-a may set a bit (e.g., an information bit) within the ACK payload for each successfully received transmission. For example, UE 115-a may be configured to use five bits for the ACK payload, regardless of information received from base station 105-a. In this case, UE 115-a may acknowledge up to five downlink transmissions (e.g., transmissions on different CCs) received from base station 105-a (e.g., based on indices of the received downlink transmissions). If UE 115-a receives fewer transmissions than the configured payload size, UE 115-a may fill the remaining bits of the payload with a default bit value (e.g., 0). UE 115-a may receive fewer transmissions due to failed decoding, interference, or due to base station 105-a transmitting fewer transmissions. For example, base station 105-a may transmit to UE 115-a using two downlink channels (e.g., PDSCHs or PDCCHs). If UE 115-a is configured with an ACK payload size of five, UE 115-a may identify the indices corresponding to the two received downlink channels and may input acknowledgement bits into the ACK payload at the indicated indices. The UE 115-a may input the default bit values (e.g., 0 or negative acknowledgement bits) into the remaining indices of the ACK payload and may transmit the resulting payload to base station 105-a. Base station 105-a may determine if it received ACK bits at the indicated indices of the ACK payload and may ignore the remaining bits.

In a second implementation, UE 115-a may dynamically configure the ACK payload size (e.g., the number of HARQ-ACK information bits). For example, UE 115-a may operate according to this second implementation if UE 115-a is configured with a dynamic PDSCH HARQ-ACK codebook. Base station 105-a may transmit assignment index bits (e.g., downlink assignment index (DAI) bits) within the DCI 215 to configure the ACK payload size for UE 115-a. In some cases, different formats of DCI 215 may include different numbers of assignment index bits (e.g., DAI bits, such as counter DAI bits or total DAI bits). For example, full DCI 215, which may be referred to as "normal" DCI, may include more assignment index bits (e.g., 4 bits, 6 bits, etc.) than fallback DCI 215 (e.g., 2 bits, 4 bits, etc.). In cases where fallback DCI 215 is implemented with 2 assignment index bits, one assignment index bit may indicate the total number of ACK bits (e.g., information bits) for the ACK payload, and the other assignment index bit may indicate the incremental ACK bits for the ACK payload. UE 115-a may receive the DCI 215 and determine the ACK payload size to implement based on the received assignment index bits. Base station 105-a may transmit the assignment index bits in a downlink grant for the PDSCH, in an uplink grant for PUCCH, or in any other type of uplink or downlink grant. In an example of combined implicit and explicit resource mapping, base station 105-a may transmit one assignment index bit (e.g., downlink assignment index (DAI) bits) within the DCI 215 to indicate whether the RRC configured semi-static ACK payload size is present or not for UE 115-a.

In some cases, DCI 215 may not include any assignment index bits. For example, the DCI 215 may be an example of a fallback DCI 215 without DAI bits for indicating ACK payload size. Even without DAI bits, the DCI 215 may indicate an ACK payload size (e.g., an ACK payload size of up to two bits). If base station 105-a implements cross-slot scheduling or CA, base station 105-a may configure different ACK resources in different PDCCH carriers. Base station 105-a may transmit two downlink channel transmissions (e.g., PDCCH transmissions on different carriers). UE 115-a may receive and decode neither, one, or both of these transmissions. Based on which PDCCH UE 115-a decodes, UE 115-a may be configured to transmit one or more ACK bits on one or more resources. For example, if UE 115-a decodes a first PDCCH, UE 115-a may transmit one ACK bit on a first resource. Alternatively, if UE 115-a decodes a second PDCCH, UE 115-a may transmit one ACK bit on a second resource. Furthermore, if UE 115-a decodes both the first and second PDCCHs, UE 115-a may transmit two ACK bits (e.g., one for each of the decoded PDCCHs) on the second resource.

Base station 105-a may receive the ACK bits in the indicated resources. In some cases, base station 105-a may perform a blind detection process on the first and second resources, where base station 105-a attempts to decode a single bit on the first resource and two bits on the second resource. If a negative acknowledgement (NACK) bit is a 0 bit, the base station 105-a may not be able to distinguish between a NACK bit for first PDCCH or no bit transmitted for the first PDCCH. Using this technique, base station 105-a may receive up to two ACK bits (e.g., an ACK payload of size two) without using any assignment index bits.

Figure 3:
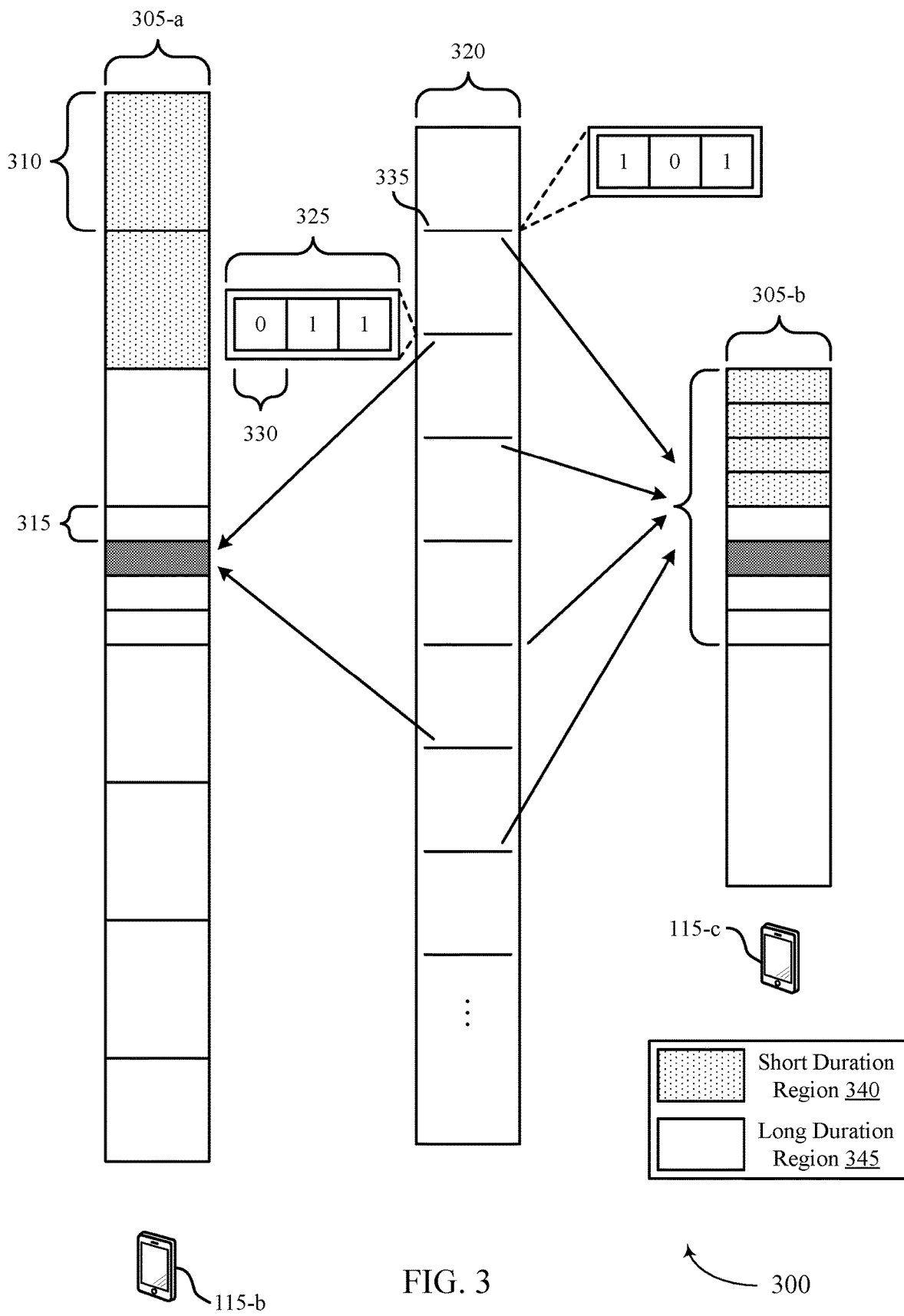
FIG. 3 illustrates an example of uplink control channel resource mapping based on resource indicator bits and control channel elements (CCEs) in accordance with aspects of the present disclosure.

FIG. 3 illustrates an example of uplink control channel resource mapping 300 based on resource indicator bits and CCEs in accordance with aspects of the present disclosure. The uplink control channel resource mapping 300 may illustrate multiple possible resource mapping implementations. In some cases, base stations 105 and UEs 115 within a wireless communications system may be configured to use one or more same techniques for resource allocation. In other cases, different UEs 115 may utilize different resource mapping techniques (e.g., depending on the number of available uplink control channel resources 305 for each UE 115).

In some wireless communications systems (e.g., NR systems), a base station 105 may service a large number of UEs 115 (e.g., hundreds of UEs) simultaneously. Such a system may utilize a large amount of scheduling uplink control channel resources 305 to reduce the chance of collisions between scheduled UE 115 resources. Additionally, each UE 115 in the system may include a large number of available uplink control channel resources 305 (e.g., resources 305-a for UE 115-b, and resources 305-b for UE 115-c). These resources 305 may be examples of PUCCH resources, where each PUCCH resource may correspond to a set of resource blocks, an orthogonal sequence index, a cyclic shift, or a combination of these parameters for UCI transmission. As illustrated, UE 115-b may include more available uplink control channel resources 305-a than UE 115-c (e.g., according to an RRC configuration for each UE 115). However, in some cases, both UE 115-b and UE 115-c may implement the same resource mapping scheme (e.g., tailored to the different numbers of resources 305).

The base station 105 may assign uplink control channel resources 305 to a UE 115 using a downlink control channel transmission. The downlink control channel transmission may contain DCI, including a set of resource indicator bits 325 (e.g., ARI bits). In some cases, these resource indicator bits 325 may be referred to as PUCCH resource indicator bits or a PUCCH resource indicator field. The set of resource indicator bits 325 may include a configured number of bits 330. As illustrated, the base station 105 may be configured to transmit DCI including three bits 330 for resource indication. This downlink control channel transmission may be transmitted in a downlink channel 320, such as a PDCCH. The DCI—and corresponding set of resource indicator bits 325—may be part of a downlink grant or an uplink grant transmitted by the base station 105.

The base station 105 may utilize the set of resource indicator bits 325 to explicitly indicate a resource mapping for a UE 115. For example, the set of resource indicator bits 325 may indicate a specific uplink control channel resource, an uplink control channel resource set 310, an uplink control channel resource index 315 within a set, or some combination of these. In some cases, this explicit resource mapping may be sufficient to indicate an uplink control channel resource to a UE 115. For example, if the set of resource indicator bits 325 includes x bits 330, then the base station 105 may uniquely indicate between up to $2^x$ uplink control channel resources. Different bit combinations of the set of resource indicator bits 325 may correspond to different uplink control channel resources. As illustrated, the set of resource indicator bits 325 may include three bits 330. In such a case, the base station 105 may explicitly indicate between up to eight different uplink control channel resources (e.g., where the bit combination 000 indicates a first resource and the bit combination 111 indicates an eighth resource). Accordingly, if a UE 115 has a number of available uplink control channel resources, y, that is less than $2^x$, the UE 115 may determine the uplink control channel resource for transmission based on the set of resource indicator bits 325.

However, in some cases, a UE 115 may have more resources 305 available than can be explicitly signaled in the set of resource indicator bits 325 (e.g., due to the large amount of resources utilized in an NR system to reduce or avoid collisions or due to a specific DCI format). In such cases, the base station 105 and UEs 115 may implement explicit and implicit mapping corresponding to the uplink control channel resources for transmission.

For example, the implicit mapping may be based on the resources used by the base station 105 to transmit the DCI. The base station 105 may transmit the DCI in one or more CCEs in the downlink channel 320. In some cases, the base station 105 may select a specific CCE index 335 for a DCI transmission according to an implicit mapping relationship. That is, the CCE index 335 (e.g., a starting CCE index, an ending CCE index, an intermediate CCE index, etc.), in combination with the set of resource indicator bits 325, may indicate an uplink control channel resource. By utilizing both the CCE indices 335 and the set of resource indicator bits 325, the base station 105 may allocate uplink control resources to a UE 115 with a number of available resources 305, y, that satisfies $y > 2^x$.

In a first implementation (e.g., as illustrated with respect to UE 115-b), the base station 105 may indicate an uplink control channel resource set 310 (e.g., a subset of PUCCH resources) using the set of resource indicator bits 325 (e.g., in a PUCCH indicator field) and may indicate a relative resource index 315 within that resource set 310 using the CCE index 335 (e.g., the starting CCE index 335). The base station 105 and a corresponding UE 115 may determine the implicit mapping (e.g., using an implicit mapping function, such as a CCE-dependent mapping function) from CCE indices 335 to relative resource indices 315 based on the number of bits 330 in a set of resource indicator bits 325, the number of available uplink control channel resources 305, an aggregation level (e.g., the number of CCEs used for sending the DCI), or a combination thereof. That is, any of these (e.g., the starting CCE index 335) or other similar parameters may be used as input to an implicit mapping function in order to determine a relative resource index 315 (e.g., a specific PUCCH resource). For example, the base station 105 and UE 115 may determine a standard size for each resource set 310 using an equation to split the total available resources 305 into a number of resource sets 310 equal to the number of possible bit combinations for the set of resource indicator bits 325. For example, the base station 105 and UE 115 may determine the size of the resource sets 310 using:

$$m = \text{ceil}\left(\frac{y}{2^x}\right), \quad (1)$$

where m is the number of resources (or, correspondingly, resource indices 315) within each resource set 310, x is the number of bits 330 in the set of resource indicator bits 325, and y is the number of total available resources 305.

In one example, UE 115-b may include 31 available or potential uplink control channel resources 305-a, and the base station 105 may transmit three bits 330 in the set of resource indicator bits 325 in the DCI. Accordingly, UE 115-b may organize the 31 resources 305-a into eight resource sets 310 (e.g., corresponding to the eight possible bit combinations of a three-bit sequence), with four resources per resource set 310 (e.g., according to the above equation). In some cases, one or more of the resource sets 310 may have a different number of resources than this calculated number of resources per resource set 310 (e.g., due to the number of total resources 305-a not being evenly divisible by the number of resource sets 310).

The base station 105 may transmit DCI to UE 115-b to allocate a resource for uplink control channel transmission. For example, the base station 105 may transmit a set of resource indicator bits 325 with the bit combination 011 in the second CCE index 335 as shown. UE 115-b may receive the DCI transmission, and may determine the resource set 310 indicated based on the bit combination. For example, 011 may correspond to the fourth resource set 310. UE 115-b may determine the relative resource index 315 within this fourth resource set 310 based on the CCE index 335 (e.g., the starting CCE index for the DCI transmission). In some configurations, UE 115-b may be configured to determine the relative resource index 315 further based upon an aggregation level of the DCI transmission. In other configurations, UE 115-b may disregard the aggregation level when determining the relative resource index 315. In yet other configurations, UE 115-b may dynamically determine whether to use the aggregation level or not based on some threshold. For example, UE 115-b may compare the number of resources per resource set, m, to a threshold number of resources. If m is less than the threshold, UE 115-b may use the aggregation level to determine the relative resource index 315. If m is greater than or equal to the threshold, UE 115-b may not use the aggregation level when determining the relative resource index 315. One example aggregation level-dependent implicit mapping is:

$$i = \left(\frac{n}{L}\right) \% m, \quad (2)$$

where i is the relative resource index 315, n is the starting CCE index 335 for the DCI transmission, and L is the aggregation level. An example of an aggregation level-independent mapping is:

$$i = (n) \% m, \quad (3)$$

where the aggregation level, L, is no longer included in the calculation. As illustrated, UE 115-b may receive the DCI, and the corresponding set of resource indicator bits 325, starting with the second CCE index 335. Assuming an aggregation level-independent calculation, UE 115-b may determine a relative resource index 315 of two (e.g., based on n=2, m=4). Accordingly, based on the combination of the set of resource indicator bits 325 and the CCE index 335, UE 115-b may determine an allocated resource in the fourth resource set 310 with a relative resource index 315 of two. UE 115-b may use this explicit and implicit resource mapping to select the 14th resource of the available uplink control channel resources 305-a for transmission of UCI.

In some cases, a base station 105 operating using this first implementation may attempt to assign resources using just explicit indications (e.g., using bits within the DCI, such as the set of resource indicator bits 325). The base station 105 may fallback on using implicit mapping if the base station 105 cannot resolve collision between the resources using just the explicit signaling (e.g., if y>2$^x$).

In a second implementation (e.g., as illustrated with respect to UE 115-c), the base station 105 and UE 115-c may utilize very similar techniques as above. However, instead of explicitly mapping the resource set 310 in the set of resource indicator bits 325 and implicitly mapping the relative resource index 315 with the CCE index 335, the base station 105 may explicitly map the relative resource index 315 in the set of resource indicator bits 325 and implicitly map the resource set 310 with the CCE index 335. For example, the base station 105 and UE 115-c may implement similar equations as above, except m may represent the number of resource sets 310, as opposed to the number or resources per resource set. As illustrated, UE 115-c may have 15 available uplink control channel resources 305-b and may organize the resources 305-b into two resource sets 310 with a standard resource set size of eight.

As illustrated, the base station 105 may transmit DCI including a set of resource indicator bits 325 with bit combination 101 starting at a first CCE index 335. Based on receiving the DCI starting at the first CCE index 335, UE 115-c may determine that the allocated resource is in the first resource set 310. Furthermore, based on the bit combination 101, UE 115-c may determine that the resource is at the 6th relative resource index 315. Using the set of resource indicator bits 325 and the CCE index 335 in combination, UE 115-c may select the 6th resource of the 15 available resources 305-b for UCI transmission (e.g., the resource corresponding to the 6th relative resource index 315 within the first resource set 310).

In a third implementation, the base station 105 and a UE 115 may implement configured offset values to explicitly and implicitly map the resources. For example, the base station 105 may indicate a delta value using the set of resource indicator bits 325. A set of resource indicator bits 325 with x bits 330 may include $2^x$ possible delta values. For example, the base station 105 and the UE 115 may each store a table in memory, where the table specifies delta values corresponding to different bit combinations. In some cases, the delta values may be evenly spaced, while in other cases the delta values may correspond to any configurable number.

Again, as above, the base station 105 and UE 115 may or may not determine the resource based on an aggregation level of the DCI (e.g., semi-statically or dynamically). The UE 115 receiving a DCI transmission with a set of resource indicator bits 325 at a starting CCE index 335 may determine implicitly determine the resource for UCI transmission using one of the following equations:

$$r = \left(\frac{n + \text{delta}}{L}\right)\% \ y \text{ or } r = (n + \text{delta})\% \ y, \qquad (4)$$

where r is the allocated uplink control channel resource, and the base station 105 and UE 115 utilize one of the equations based on whether the mapping is aggregation level-dependent or aggregation level-independent.

The base station 105 may additionally or alternatively indicate a duration for an uplink control channel transmission using the DCI. For example, UEs 115 may be RRC configured to transmit UCI using either a short duration transmission or a long duration transmission. For example, a short duration transmission may span a fewer number of symbols than a long duration transmission (e.g., 1 or 2 symbols for a short duration transmission, 7 or 14 symbols for a long duration transmission). When the UE 115 is semi-statically configured to transmit using a certain uplink control channel transmission duration, the base station 105 may not include an indication of a duration.

In some cases, a UE 115 may be configured to dynamically switch between different length transmission durations. In these cases, the base station 105 may assign either a short or long transmission duration to the UE 115 using the DCI transmission. In one implementation, the base station 105 may use an indicator bit (e.g., an ARI) to indicate either a short or long duration (e.g., a 0 bit value may indicate a short duration, while a 1 bit value may indicate a long duration). In a second implementation, the base station 105 and UE 115 may configure the resources 305 to indicate either a short duration or a long duration. For example, when the UE 115 determines the resource index to utilize for an uplink control channel transmission, the UE 115 may determine a duration corresponding to the resource index. As illustrated, the resources 305 may include a short duration region 340 and a long duration region 345. If a UE 115 is assigned a resource in the short duration region 340, the UE 115 may determine to transmit the UCI using a short duration uplink control channel transmission (e.g., using a short PUCCH resource), and if the UE 115 is assigned a resource in the long duration region 345, the UE 115 may determine to transmit the UCI using a long duration uplink control channel transmission (e.g., using a long PUCCH resource). In another example, different regions of the downlink channel 320 (e.g., the PDCCH) may correspond to the short duration region 340 and the long duration region 345.

In some wireless communications systems, base stations 105 and UEs 115 may implement a unified framework utilizing one or more of the above techniques. The techniques utilized may depend on the number of bits 330, x, within a set of resource indicator bits 330, and the number of resources 305, y, available per UE 115. The base stations 105 and UEs 115 may implement explicit signaling of uplink control channel resource allocations if $y<2^x$. Alternatively, if $x>0$ and $y>2^x$, the base stations 105 and UEs 115 may utilize a combination of implicit and explicit signaling as described above. Furthermore, if x=0, the base stations 105 and UEs 115 may utilize implicit mapping without any explicit mapping in resource indicator bits. In these cases, the UE 115 may determine the allocated resource based on some implicit characteristic of the DCI, such as the starting CCE index 335. To indicate a short or long duration for the UCI transmission (e.g., in the cases where the UE 115 may dynamically determine a duration), the base station 105 may indicate the duration length using one or more resource indictor bits (e.g., ARI bits) in the DCI, or may divide the downlink channel 320 or resources 305 into short duration and long duration regions 340 and 345.

The above implementations may apply to any uplink control channel transmission formats. For example, base stations 105 and UEs 115 utilizing short PUCCH formats with 1 or 2 bits, long PUCCH formats with 1 or 2 bits, short PUCCH formats with more than 2 bits, long PUCCH formats with more than 2 bits, or any other formats may implement the above techniques for resource allocation. Additionally, the implementations may apply to any UCI type (e.g., ACK UCI, CQI, etc.).

Figure 4A:
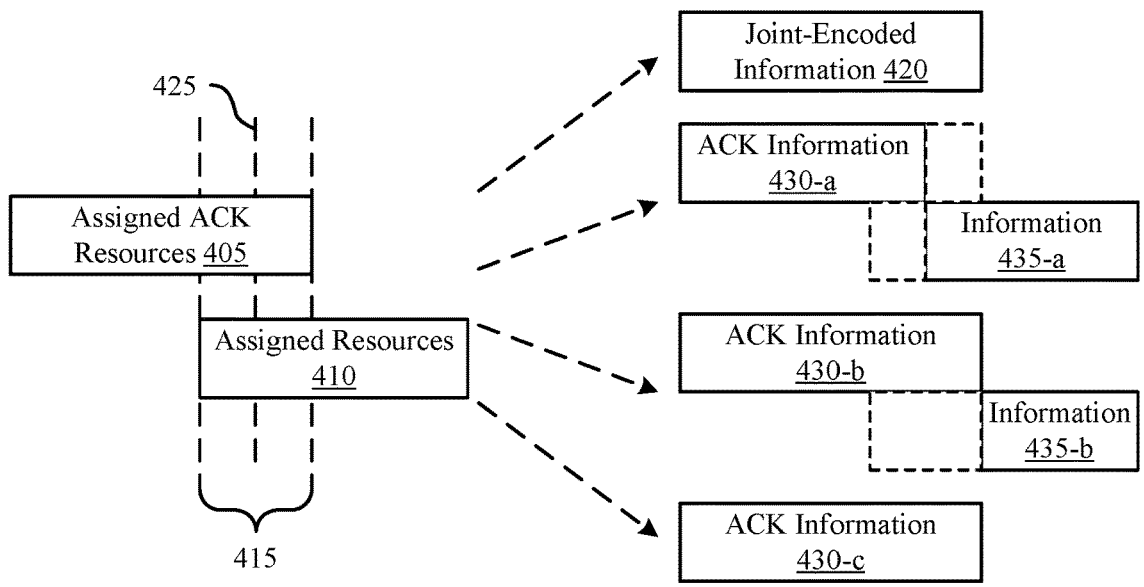
FIGS. 4A, 4B, and 4C illustrate examples of techniques for handling resource collision in accordance with aspects of the present disclosure.
Figure 4B:
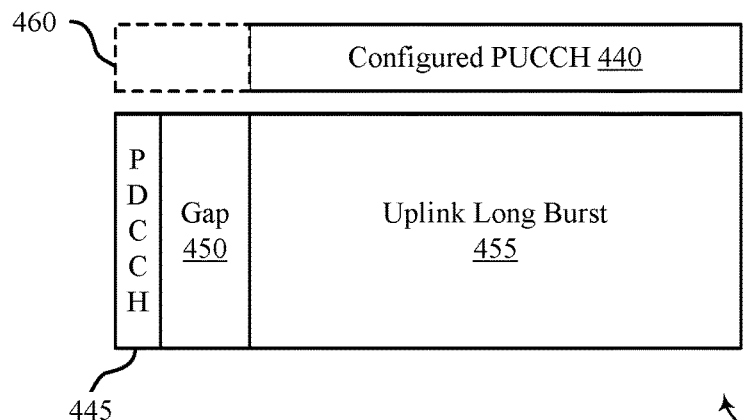
Figure 4C:
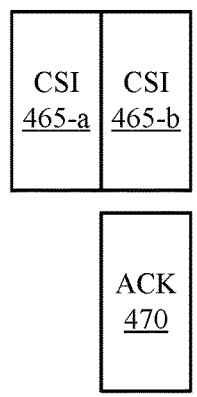

FIGS. 4A, 4B, and 4C illustrate examples of techniques for handling resource collision 400 in accordance with aspects of the present disclosure. For example, FIG. 4A illustrates techniques for handling resource collision 400-*a* in accordance with various aspects of the present disclosure. In some cases, a UE 115 may be assigned resources that collide in time domain. For example, the UE 115 may be assigned ACK resources 405 for a first time period and assigned resources 410 for a second time period, where the first and second time periods overlap at overlapping symbols 415. In these cases, the UE 115 may utilize one or more techniques to handle the assigned resource collision.

As described, the UE 115 receives a colliding ACK assignment with any other type of assignment (e.g., an SR assignment, a CQI assignment, etc.). It is to be understood that the following description also applies to colliding assignments that do not include an ACK assignment. Additionally, one or more of the following techniques may be used together (e.g., if more than two resource assignments collide in time).

In some cases, a UE 115 or base station 105 may operate based on a number of bits in the resource allocations. For example, for 1 or 2 bits of ACK and SR resources in a long duration, a base station 105 may perform blind decoding on either the assigned ACK resources 405 or the SR assigned resources 410. For 1 or 2 bits of ACK and SR resources in a short duration, the base station 105 and UE 115 may utilize a short uplink channel (e.g., PUCCH) sequence design (e.g., mapping to a specific sequence cyclic shift value).

In some cases (e.g., for greater than two bits of ACK and SR), a UE 115 and base station 105 may implement a first technique. This first technique may involve the UE 115 performing joint-encoding of ACK information with SR information, and transmitting this joint-encoded information 420 on the assigned ACK resources 405. That is, the UE 115 may multiplex the ACK and SR information in a single PUCCH transmission.

Similar to the SR cases described above, a UE 115 and base station 105 may operate based on a number of bits in the resource allocations for ACK and CQI collisions. For example, for 1 or 2 bits of ACK and CQI resources in a long duration, a UE 115 may include modulated demodulation reference signals (DMRSs) in the CQI assigned resources 410. For 1 or 2 bits of ACK and CQI resources in a short duration, the UE 115 may include modulated DMRSs in the CQI assigned resources 410, or may perform joint-encoding (e.g., as described above) of ACK information and CQI information.

In some cases, the UE 115 and base station 105 may operate using one or more of the following techniques. In a first technique, the UE 115 may perform joint-encoding of the ACK information and the CQI information and may transmit the joint-encoded information 420 in either the assigned ACK resources 405 or the CQI assigned resources 410. That is, the UE 115 may multiplex the ACK and CQI information in a single PUCCH transmission. In this case, both the UE 115 and a base station 105 may use a combined payload size (e.g., for the combination of the ACK and CQI information). This case may be implemented for any number of bits of ACK and CQI or for specific numbers of ACK and CQI bits (e.g., for greater than two bits of ACK and CQI).

In a second or third technique, the UE 115 may implement time division multiplexing (TDM) of the assigned resources 405 and 410. In these cases, the UE 115 may transmit the ACK information on the assigned ACK resources 405 and may transmit the CQI information on the CQI assigned resources 410. The UE 115 may utilize an even splitting technique or a biased splitting technique for modifying the resource assignments. For example, with even splitting, the UE 115 may the overlapping symbols 415 in half at 425 and may assign half of the symbols to the assigned ACK resources 405 and the other half to the assigned CQI resources 410. The UE 115 may then transmit the ACK information 430-*a* in the modified assigned ACK resources 405 and the other information 435-*a* (e.g., CQI information, SR information if applying TDM to SR collisions, etc.) in the other assigned resources 410.

In some cases, instead of splitting the overlapping symbols 415 evenly, the UE 115 may assign these overlapping symbols to a single set of assigned resources using a biased technique. For example, in some cases, the UE 115 may prioritize transmitting ACK information 430-*b*. In this case, the UE 115 may assign the overlapping symbols 415 to the assigned ACK resources 405 and may transmit the ACK information 430-*b* in the originally assigned ACK resources 405. The UE 115 may additionally transmit other information 435-*b* in the modified assigned resources 410 (e.g., CQI information in modified CQI assigned resources 410). In some cases, the UE 115 may split the overlapping symbols 415 in such a way so that the assigned ACK resources 405 receive a different number of symbols than the other assigned resources 410.

In a fourth technique, the UE 115 may drop one transmission (e.g., according to one or more dropping rules configured for the UE 115), and only transmit some information using one of the sets of assigned resources. For example, as illustrated, the UE 115 may drop the information (e.g., CQI information) for the assigned resources 410, and may just transmit ACK information 430-*c* in the assigned ACK resources 405.

In some cases, the UE 115 may utilize a combination of these techniques. For example, if the UE 115 receives colliding resource allocations for an ACK transmission, an SR transmission, and a CQI transmission, the UE 115 may perform joint-encoding to encode and transmit some of the information together (e.g., the ACK and SR information, and may perform one of the resource splitting techniques above to transmit the third set of information in a different set of resources (e.g., transmitting the CQI information in a modified set of CQI resources).

In another example of resource collision, a UE 115 may be configured by a base station 105 with overlapping long channel and a short channel allocations. The durations of these long and short PUCCH resources may be RRC configured. In some cases, to avoid frequency division multiplexing (FDM) of these long and short channels, the UE 115 may schedule a shorter version of the long channel (e.g., to remove any overlapping symbols 415) by dropping the last portion of the long channel transmission. In some cases, a short duration channel transmission (e.g., a short ACK transmission, a short SR transmission, or a combination of the two) may be dynamically configured to be a self-contained transmission. These collision avoidance techniques may apply to any combination of long and short duration collisions (e.g., long physical uplink shared channel (PUSCH), long CQI, long ACK, long SR, short PUSCH, short CQI, short ACK, short SR, etc.).

FIG. 4B illustrates a technique for handling resource collision 400-*b* in accordance with various aspects of the present disclosure. In this example of resource collision, a UE 115 may be assigned uplink control channel resources (e.g., PUCCH resources 440) that do not align with a slot structure of the UE 115. For example, a base station 105 may configure the UE 115 for a long PUCCH transmission 440 starting in symbol 0 with a duration of 14 symbols in a slot. However, the assigned slot may include one or more downlink symbols (e.g., a PDCCH symbol 445) and one or more gap symbols 450 in addition to an uplink long burst 455 allocation. In these cases, the UE 115 may adjust the resource allocation to match the slot structure. For example, the UE 115 may remove the first 3 symbols 460 of the long PUCCH transmission 440 so that the UE 115 may transmit the PUCCH information in the uplink long burst 455 region.

FIG. 4C illustrates a technique for handling resource collision 400-*c* in accordance with various aspects of the present disclosure. In this example of resource collision, a UE 115 may be configured by a base station 105 with overlapping channel state information (CSI) symbols 465 and ACK symbols 470. For example, the UE 115 may be allocated a two symbol CSI 465-*a* and 465-*b*, along with an overlapping one symbol ACK 470. This may be an example of a self-contained ACK 470.

To avoid performing a multi-cluster transmission (e.g., where the UE 115 transmits with disjoint RBs), the UE 115 may modify the symbols or transmissions. For example, the UE 115 may drop both CSI symbols 465 (and the corresponding CQI) and may just transmit the ACK information in the ACK symbol 470. In another case, the UE 115 may drop any overlapping CSI symbols 465 (e.g., CSI symbol 465-*b*), and may transmit CSI (e.g., CQI) using the remaining CSI symbols 465. For example, the UE 115 may transmit using CSI symbol 465-*a* and ACK symbol 470. In yet another case, the UE 115 may perform joint-encoding in one or more symbols. For example, the UE 115 may transmit using CSI symbol 465-*a* and may joint-encode the CSI or CQI information for CSI symbol 465-*b* with the ACK information for ACK symbol 470 and may transmit the joint-encoded information in the second symbol.

Figure 5:
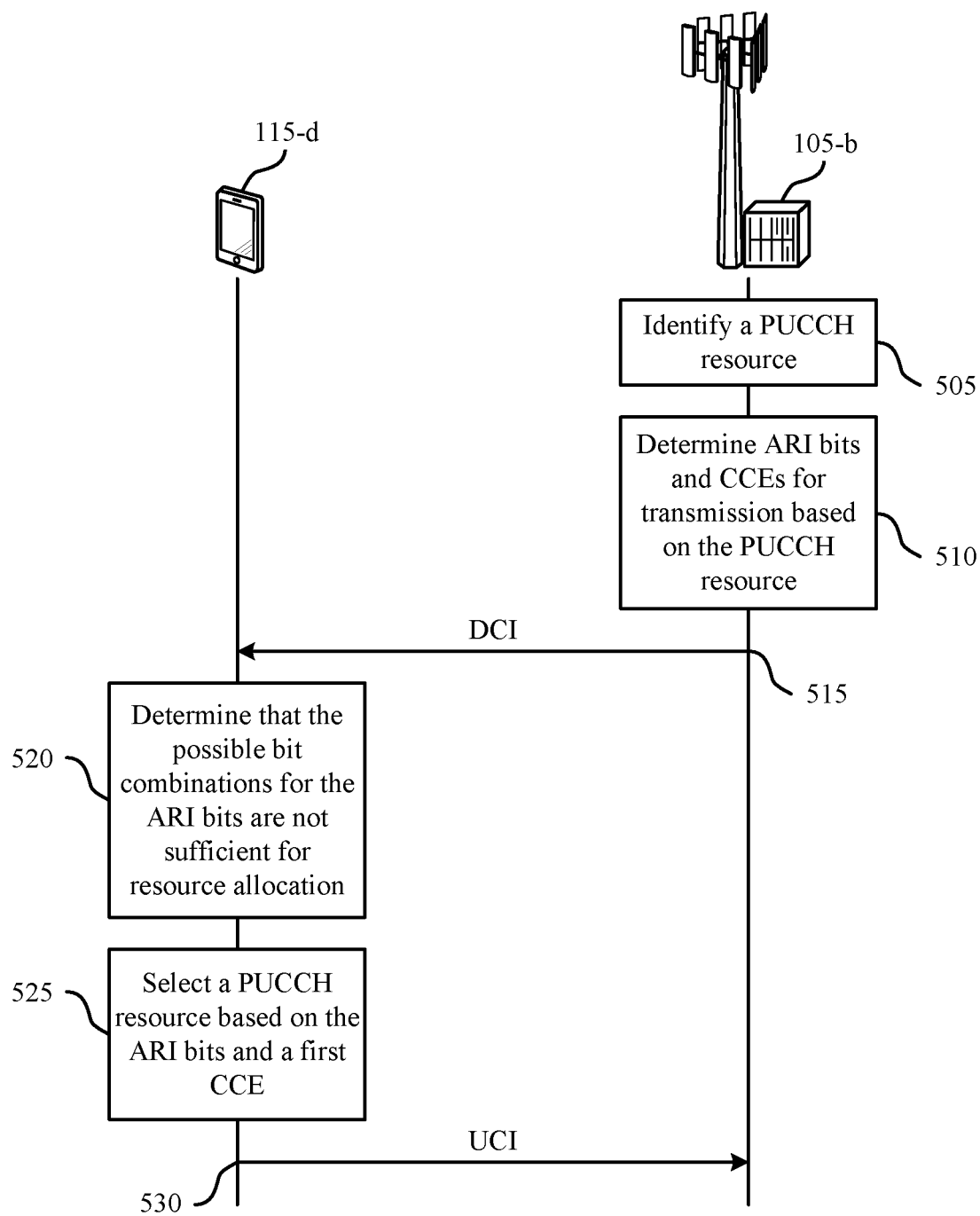
FIG. 5 illustrates an example of a process flow that supports uplink control channel allocation in accordance with aspects of the present disclosure.

FIG. 5 illustrates an example of a process flow 500 that supports uplink control channel allocation in accordance with aspects of the present disclosure. The process flow 500 may include a base station 105-*b* and a UE 115-*d*, which may be examples of the devices described above, for example, with reference to FIGS. 1 through 4.

At 505, base station 105-*b* may identify an uplink control channel resource for allocation. At 510, base station 105-*b* may determine resource indicator bits (e.g., ARI bits) and a first CCE for transmission based on the identified resource. For example, base station 105-*b* may determine a set of resource indicator bits based on the identified uplink control channel resource, and may select one or more CCEs for transmission, where the first CCE of the one or more CCEs and the set of resource indicator bits indicate the uplink control channel resource (e.g., according to some explicit or implicit resource mapping). At 515, base station 105-*b* may transmit the set of resource indicator bits in the one or more CCEs to UE 115-*d*.

UE 115-*d* may receive the set of resource indicator bits in the one or more CCEs, and may determine, at 520, that a number of possible bit combinations for the set of resource indicator bits is less than a number of available uplink control channel resources. Based on this determination, UE 115-*d* may identify the first CCE of the one or more CCEs. At 525, UE 115-*d* may select an uplink control channel resource for UCI transmission based on the set of resource indicator bits and the first CCE of the one or more CCEs. At 530, UE 115-*d* may transmit the UCI using the selected uplink control channel resource to base station 105-*b*.

Figure 6:
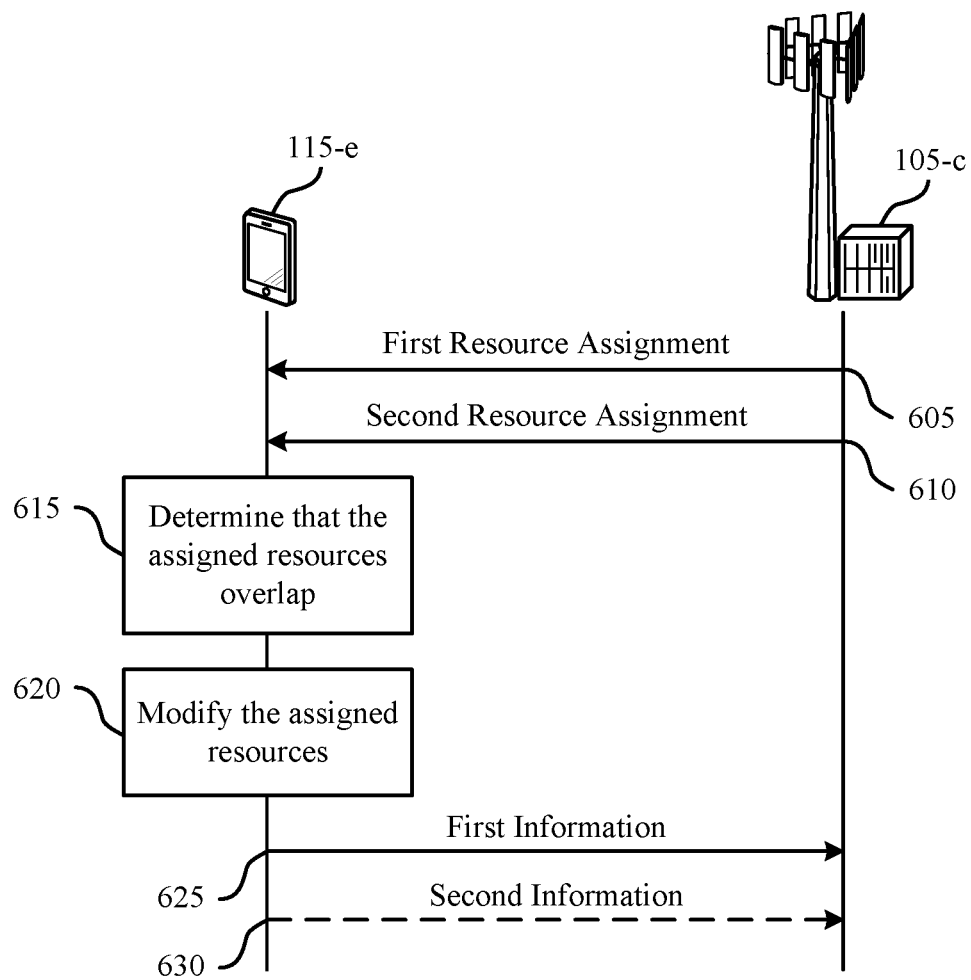
FIG. 6 illustrates an example of a process flow that supports resource collision handling in accordance with aspects of the present disclosure.

FIG. 6 illustrates an example of a process flow 600 that supports resource collision handling in accordance with aspects of the present disclosure. The process flow 600 may include a base station 105-*c* and a UE 115-*e*, which may be examples of the devices described above, for example, with reference to FIGS. 1 through 5.

At 605, base station 105-*c* may transmit a first resource assignment for a first set of symbols to UE 115-*e* (e.g., an ACK resource assignment). At 610, base station 105-*c* may transmit a second resource assignment for a second set of symbols to UE 115-*e* (e.g., an SR or CQI resource assignment). At 615, UE 115-*e* may determine that first resources for the first resource assignment and second resources for the second resource assignment collide (e.g., one or more symbols of the first set of symbols and the second set of symbols overlap). At 620, UE 115-*e* may modify the first resources for the first resource assignment, the second resources for the second resource assignment, or both. At 625, UE 115-*c* may transmit first information based on the first resource assignment (e.g., in some cases, modified first resources) to base station 105-*c*. In some cases, at 630, UE 115-*c* may transmit second information to base station 105-*c* (e.g., in modified second resources). In some cases, UE 115-*e* may joint-encode the first information and second information and may transmit both together in the first or second resources.

Figure 7:
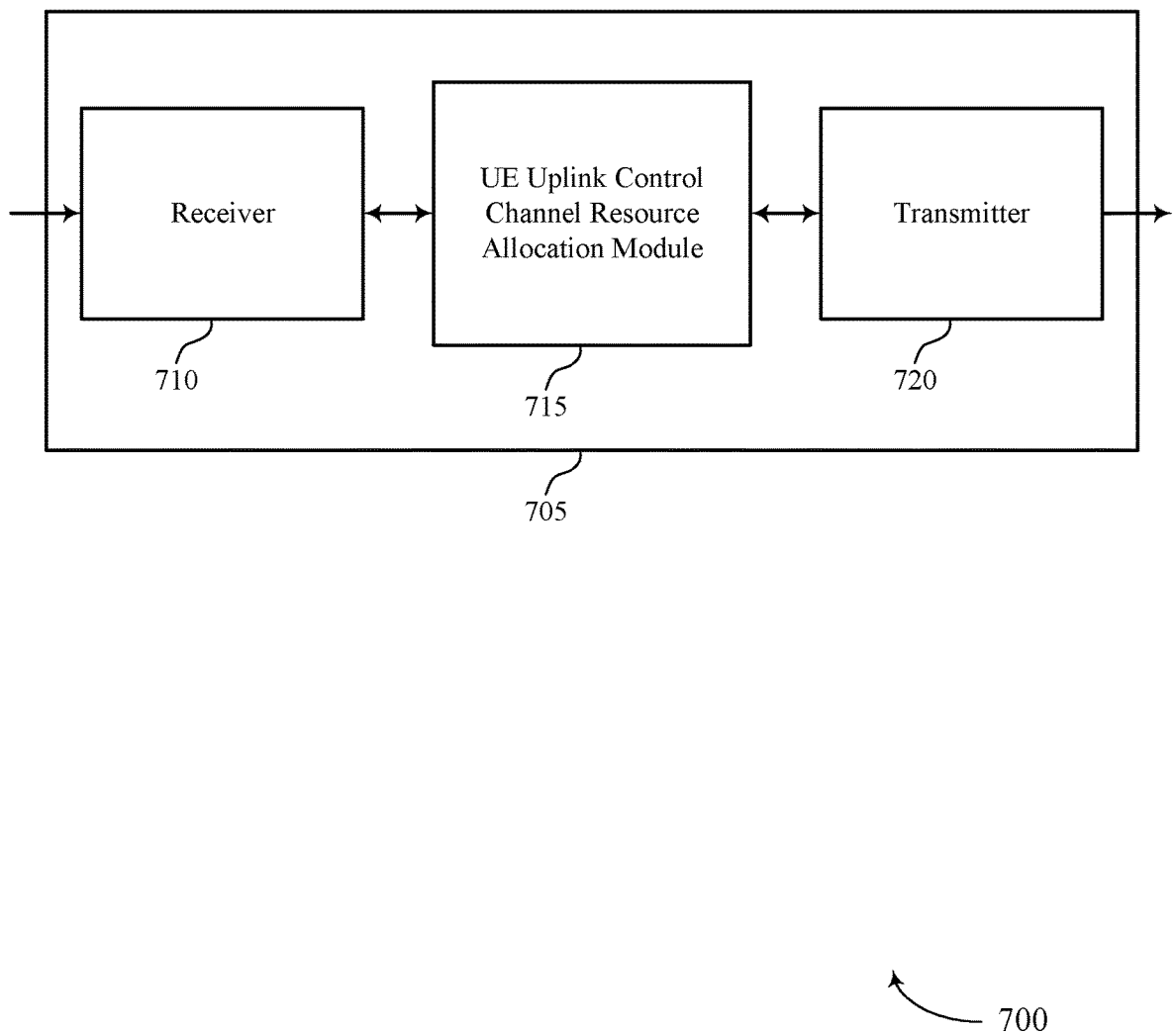
FIGS. 7 through 9 show block diagrams of a device that supports uplink control channel resource allocation in accordance with aspects of the present disclosure.

FIG. 7 shows a block diagram 700 of a wireless device 705 in accordance with aspects of the present disclosure. Wireless device 705 may be an example of aspects of a UE 115 as described herein. Wireless device 705 may include receiver 710, UE uplink control channel resource allocation module 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to uplink control channel resource allocation, etc.). Information may be passed on to other components of the device. The receiver 710 may be an example of aspects of the transceiver 1035 described with reference to FIG. 10. The receiver 710 may utilize a single antenna or a set of antennas.

UE uplink control channel resource allocation module 715 may be an example of aspects of the UE uplink control channel resource allocation module 1015 described with reference to FIG. 10. UE uplink control channel resource allocation module 715 and/or at least some of its various sub-components may be implemented in hardware, software executed by a processor, firmware, or any combination thereof. If implemented in software executed by a processor, the functions of the UE uplink control channel resource allocation module 715 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure. The UE uplink control channel resource allocation module 715 and/or at least some of its various sub-components may be physically located at various positions, including being distributed such that portions of functions are implemented at different physical locations by one or more physical devices. In some examples, UE uplink control channel resource allocation module 715 and/or at least some of its various sub-components may be a separate and distinct component in accordance with various aspects of the present disclosure. In other examples, UE uplink control channel resource allocation module 715 and/or at least some of its various sub-components may be combined with one or more other hardware components, including but not limited to an input/output (I/O) component, a transceiver, a network server, another computing device, one or more other components described in the present disclosure, or a combination thereof in accordance with various aspects of the present disclosure.

UE uplink control channel resource allocation module 715 may receive a set of resource indicator bits in one or more CCEs, determine that possible bit combinations for the set of resource indicator bits is less than available uplink control channel resources, identify a first CCE of the one or more CCEs based on the determining, select an uplink control channel resource for UCI transmission based on the set of resource indicator bits and the first CCE of the one or more CCEs, and transmit the UCI using the selected uplink control channel resource.

Additionally or alternatively, UE uplink control channel resource allocation module 715 may receive a first resource assignment for a first set of symbols, receive a second resource assignment for a second set of symbols, where the first set of symbols and the second set of symbols include an overlapping set of symbols, modify first resources for the first resource assignment, second resources for the second resource assignment, or both, and transmit first information based on the first resource assignment.

Transmitter 720 may transmit signals generated by other components of the device. In some examples, the transmitter 720 may be collocated with a receiver 710 in a transceiver module. For example, the transmitter 720 may be an example of aspects of the transceiver 1035 described with reference to FIG. 10. The transmitter 720 may utilize a single antenna or a set of antennas.

Figure 8:
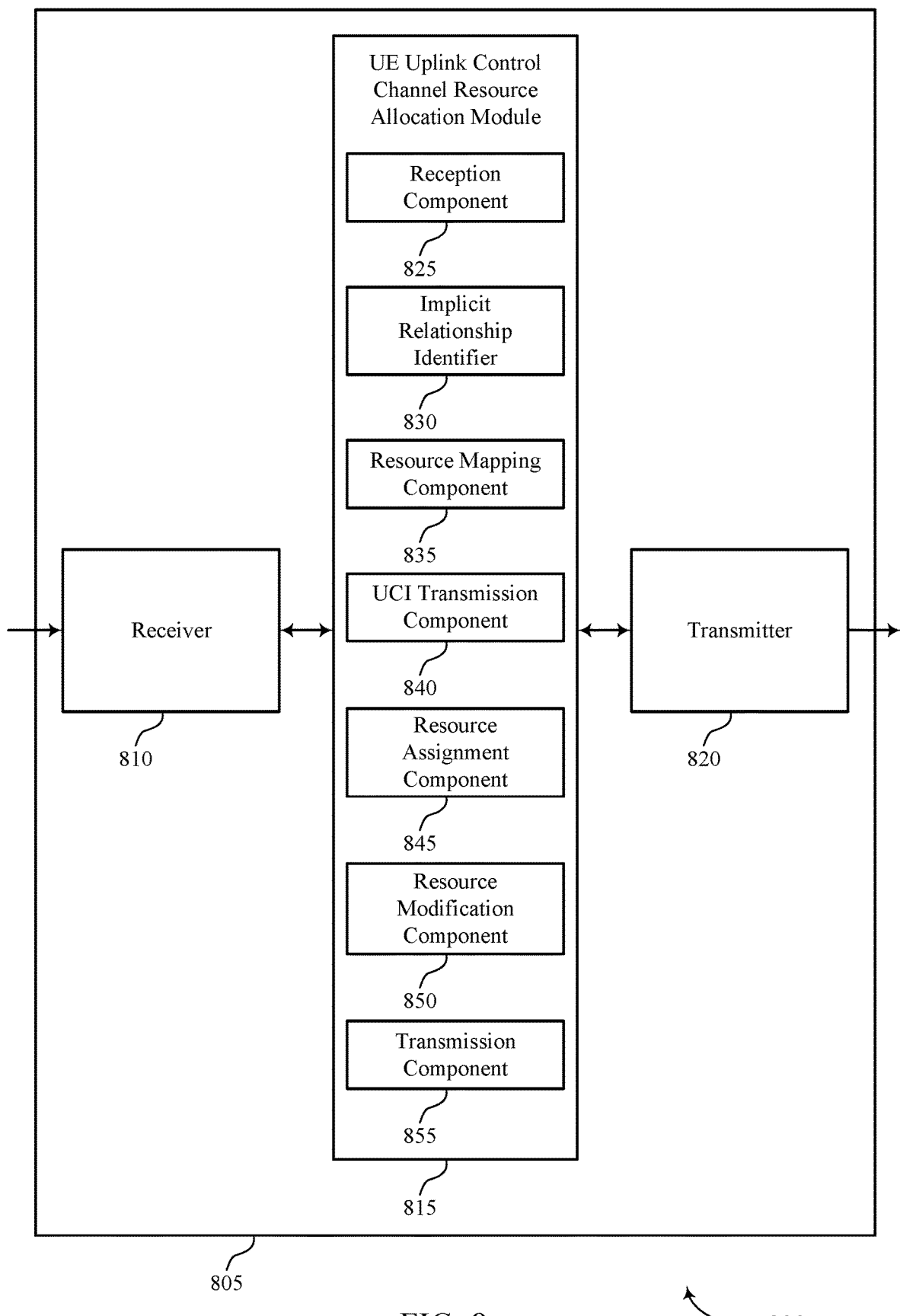

FIG. 8 shows a block diagram 800 of a wireless device 805 in accordance with aspects of the present disclosure. Wireless device 805 may be an example of aspects of a wireless device 705 or a UE 115 as described with reference to FIG. 7. Wireless device 805 may include receiver 810, UE uplink control channel resource allocation module 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to uplink control channel resource allocation, etc.). Information may be passed on to other components of the device. The receiver 810 may be an example of aspects of the transceiver 1035 described with reference to FIG. 10. The receiver 810 may utilize a single antenna or a set of antennas.

UE uplink control channel resource allocation module 815 may be an example of aspects of the UE uplink control channel resource allocation module 1015 described with reference to FIG. 10. UE uplink control channel resource allocation module 815 may also include reception component 825, implicit relationship identifier 830, resource mapping component 835, UCI transmission component 840, resource assignment component 845, resource modification component 850, and transmission component 855.

Reception component 825 may receive a set of resource indicator bits in one or more CCEs. In some cases, the set of resource indicator bits is received in a downlink grant or an uplink grant. In some cases, the set of resource indicator bits includes a set of ARI bits.

Implicit relationship identifier 830 may determine that possible bit combinations for the set of resource indicator bits is less than available uplink control channel resources. Implicit relationship identifier 830 may also identify a first CCE of the one or more CCEs based on the determining. In some cases, the first CCE of the one or more CCEs includes an initial CCE for the downlink grant or the uplink grant.

Resource mapping component 835 may select an uplink control channel resource for UCI transmission based on the set of resource indicator bits and the first CCE of the one or more CCEs.

UCI transmission component 840 may transmit the UCI using the selected uplink control channel resource.

Additionally or alternatively, resource assignment component 845 may receive a first resource assignment for a first set of symbols and may receive a second resource assignment for a second set of symbols, where the first set of symbols and the second set of symbols include an overlapping set of symbols.

Resource modification component 850 may modify first resources for the first resource assignment, second resources for the second resource assignment, or both.

Transmission component 855 may transmit first information based on the first resource assignment.

Transmitter 820 may transmit signals generated by other components of the device. In some examples, the transmitter 820 may be collocated with a receiver 810 in a transceiver module. For example, the transmitter 820 may be an example of aspects of the transceiver 1035 described with reference to FIG. 10. The transmitter 820 may utilize a single antenna or a set of antennas.

Figure 9:
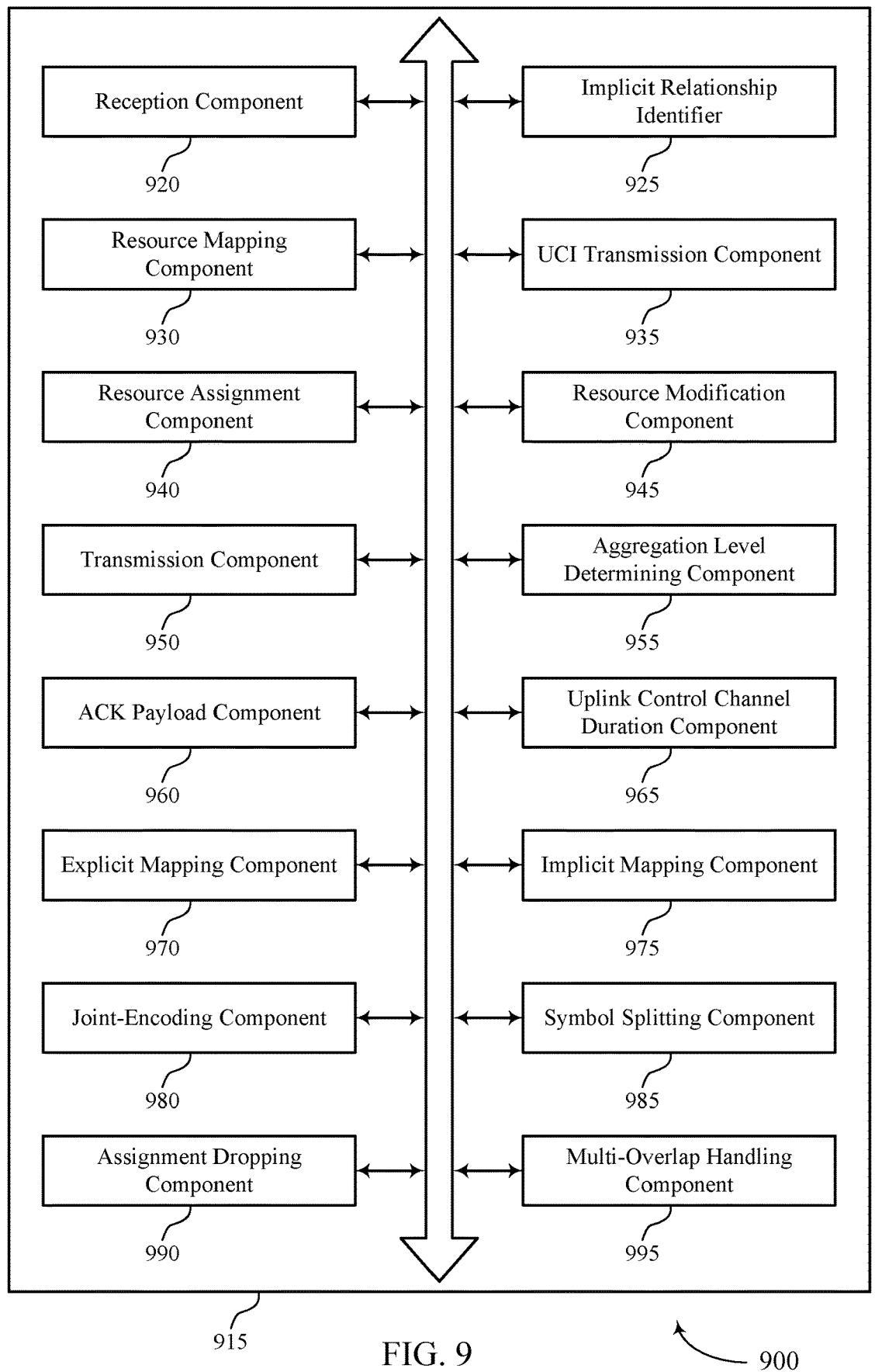

FIG. 9 shows a block diagram 900 of a UE uplink control channel resource allocation module 915 in accordance with aspects of the present disclosure. The UE uplink control channel resource allocation module 915 may be an example of aspects of a UE uplink control channel resource allocation module 715, a UE uplink control channel resource allocation module 815, or a UE uplink control channel resource allocation module 1015 described with reference to FIGS. 7, 8, and 10. The UE uplink control channel resource allocation module 915 may include reception component 920, implicit relationship identifier 925, resource mapping component 930, UCI transmission component 935, resource assignment component 940, resource modification component 945, transmission component 950, aggregation level determining component 955, ACK payload component 960, uplink control channel duration component 965, explicit mapping component 970, implicit mapping component 975, joint-encoding component 980, symbol splitting component 985, assignment dropping component 990, and multi-overlap handling component 995. Each of these modules may communicate, directly or indirectly, with one another (e.g., via one or more buses).

Reception component 920 may receive a set of resource indicator bits in one or more CCEs. In some cases, the set of resource indicator bits is received in a downlink grant or an uplink grant. In some cases, the set of resource indicator bits includes a set of ARI bits.

Implicit relationship identifier 925 may determine that possible bit combinations for the set of resource indicator bits is less than available uplink control channel resources and identify a first CCE of the one or more CCEs based on the determining. In some cases, the first CCE of the one or more CCEs includes an initial CCE for the downlink grant or the uplink grant.

Resource mapping component 930 may select an uplink control channel resource for UCI transmission based on the set of resource indicator bits and the first CCE of the one or more CCEs. In some cases, selecting the uplink control channel resource includes determining an uplink control channel resource set based on the set of resource indicator bits, and determining a relative uplink control channel resource index based on the first CCE, where the selected uplink control channel resource corresponds to the relative uplink control channel resource index within the uplink control channel resource set. In some cases, selecting the uplink control channel resource includes determining an uplink control channel resource set based on the first CCE, and determining a relative uplink control channel resource index based on the set of resource indicator bits, where the selected uplink control channel resource corresponds to the relative uplink control channel resource index within the uplink control channel resource set. In some cases, selecting the uplink control channel resource includes determining an offset value based on the set of resource indicator bits, and selecting the uplink control channel resource based on a combination of the first CCE and the determined offset value. In some cases, selecting the uplink control channel resource is further based on an aggregation level. In some cases, the uplink control channel resource includes a PUCCH resource. UCI transmission component 935 may transmit the UCI using the selected uplink control channel resource.

Aggregation level determining component 955 may compare uplink control channel resource indices within an uplink control channel resource set to a threshold of resources and determine to select the uplink control channel resource based on an aggregation level if the uplink control channel resource indices within the uplink control channel resource set is less than the threshold of resources.

In some cases, the UCI includes ACK bits according to an ACK payload size. In some cases, the ACK payload size includes an RRC configured ACK payload size. ACK payload component 960 may receive a number of downlink shared channels that is less than the ACK bits according to the RRC configured ACK payload size, insert ACK bits of a bit value corresponding to decoded results of the downlink shared channels into an ACK payload, and insert ACK bits of a default bit value corresponding to non-received downlink shared channels into the ACK payload to obtain the RRC configured ACK payload size. In some cases, ACK payload component 960 may receive a set of assignment index bits in DCI and determine the ACK payload size based on the set of assignment index bits. In some cases, the DCI includes a number of assignment index bits based on a format of the DCI. In some cases, ACK payload component 960 may receive a first downlink control channel transmission in a first TTI, a second downlink control channel transmission in a second TTI, or both, and determine the ACK payload size, ACK bit resources, or both based on receiving the first downlink control channel transmission, the second downlink control channel transmission, or both.

In some cases, uplink control channel duration component 965 may determine to transmit the UCI in either a short uplink control channel transmission or a long uplink control channel transmission based on the set of resource indicator bits. In other cases, the UCI is transmitted in either a short uplink control channel transmission or a long uplink control channel transmission according to an RRC configuration.

Explicit mapping component 970 may receive a second set of resource indicator bits in a second set of CCEs, determine that updated possible bit combinations for the second set of resource indicator bits is equal to or greater than updated available uplink control channel resources, and select a second uplink control channel resource for a second UCI transmission based on the second set of resource indicator bits, where selecting the second uplink control channel resource is not based on a first CCE of the second set of CCEs according to determining that the updated possible bit combinations for the second set of resource indicator bits is equal to or greater than the updated available uplink control channel resources.

Implicit mapping component 975 may receive additional downlink control information in a second set of CCEs, determine that the additional downlink control information includes fewer resource indicator bits than a threshold of bits, select a second uplink control channel resource for a second UCI transmission based on a CCE of the second set of CCEs, where selecting the second uplink control channel resource is based on determining that the additional downlink control information includes fewer resource indicator bits than the threshold of bits, and transmit the second UCI using the selected second uplink control channel resource. In some cases, the additional downlink control information includes zero resource indicator bits. In these cases, the second UCI is transmitted in either a short uplink control channel transmission or a long uplink control channel transmission according to an RRC configuration. In some cases, the additional downlink control information includes at least one resource indicator bit. In these cases, the second UCI is transmitted in either a short uplink control channel transmission or a long uplink control channel transmission based on the at least one resource indicator bit.

Resource assignment component 940 may receive a first resource assignment for a first set of symbols and receive a second resource assignment for a second set of symbols, where the first set of symbols and the second set of symbols include an overlapping set of symbols. In some cases, the first resource assignment and the second resource assignment correspond to different length resource assignments. In some cases, the first resource assignment, the second resource assignment, or both include an ACK resource assignment, an SR resource assignment, a CQI resource assignment, a CSI resource assignment, or a combination thereof.

Resource modification component 945 may modify first resources for the first resource assignment, second resources for the second resource assignment, or both.

Transmission component 950 may transmit first information based on the first resource assignment.

Joint-encoding component 980 may perform joint-encoding of the first information with second information associated with the second resource assignment and transmit the joint-encoded first information and second information. In some cases, the joint-encoded first information and second information is transmitted in the first resources for the first resource assignment.

Symbol splitting component 985 may assign each symbol of the overlapping set of symbols to either the first resources for the first resource assignment or the second resources for the second resource assignment and transmit second information associated with the second resource assignment based on the assigning.

Assignment dropping component 990 may avoid a transmission of second information associated with the second resource assignment based on the overlapping set of symbols.

Multi-overlap handling component 995 may receive a third resource assignment for a third set of symbols, where the third set of symbols includes at least a portion of the overlapping set of symbols, perform joint-encoding of the first information with second information associated with the second resource assignment, transmit the joint-encoded first information and second information in the first resources for the first resource assignment, and transmit third information associated with the third resource assignment based on the third resource assignment.

Figure 10:
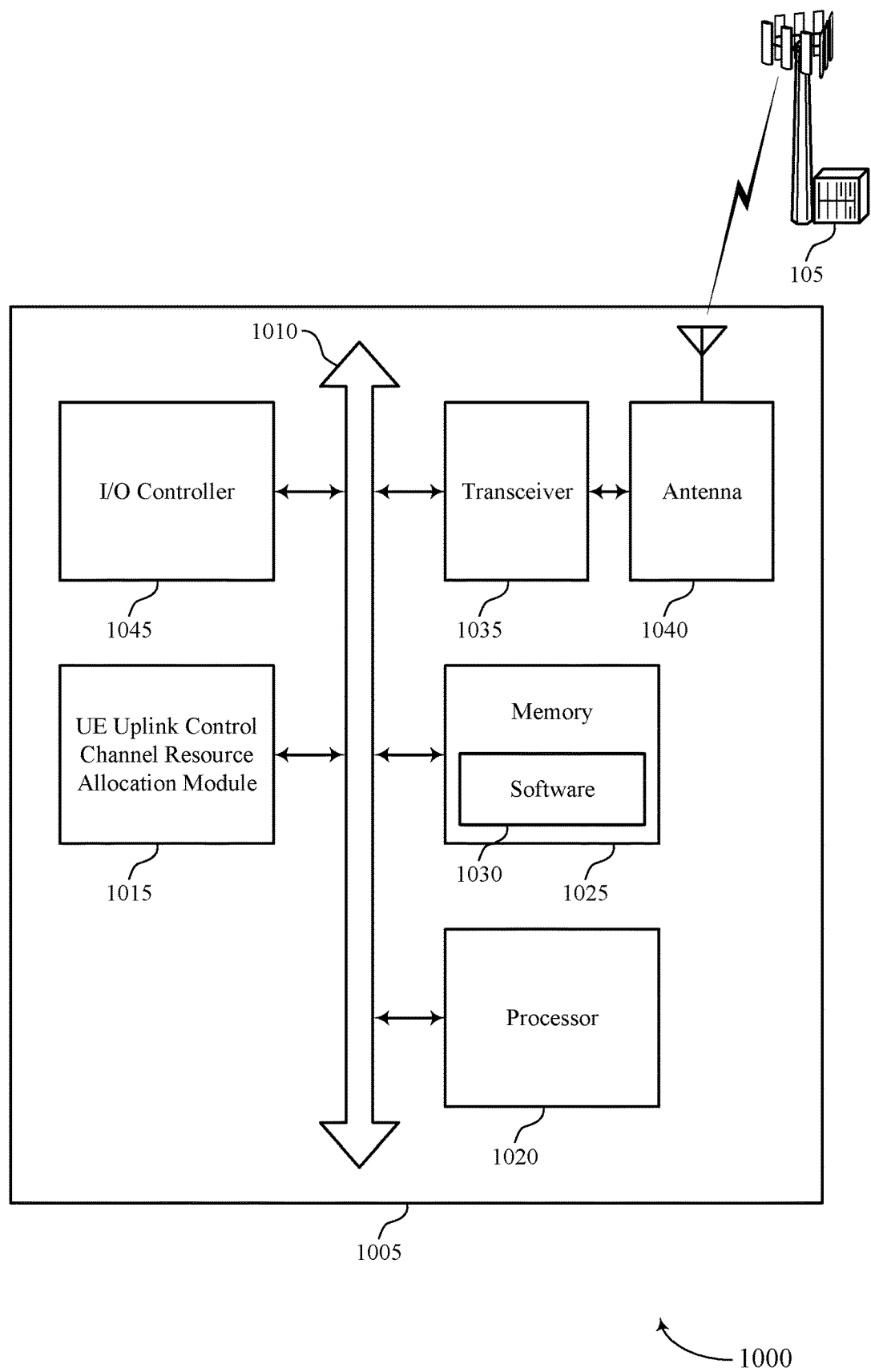
FIG. 10 illustrates a block diagram of a system including a device in accordance with aspects of the present disclosure.

FIG. 10 shows a diagram of a system 1000 including a device 1005 in accordance with aspects of the present disclosure. Device 1005 may be an example of or include the components of wireless device 705, wireless device 805, or a UE 115 as described above, e.g., with reference to FIGS. 7 and 8. Device 1005 may include components for bi-directional voice and data communications including components for transmitting and receiving communications, including UE uplink control channel resource allocation module 1015, processor 1020, memory 1025, software 1030, transceiver 1035, antenna 1040, and I/O controller 1045. These components may be in electronic communication via one or more buses (e.g., bus 1010). Device 1005 may communicate wirelessly with one or more base stations 105.

Processor 1020 may include an intelligent hardware device (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1020 may be configured to operate a memory array using a memory controller. In other cases, a memory controller may be integrated into processor 1020. Processor 1020 may be configured to execute computer-readable instructions stored in a memory to perform various functions (e.g., functions or tasks supporting uplink control channel resource allocation).

Memory 1025 may include random access memory (RAM) and read only memory (ROM). The memory 1025 may store computer-readable, computer-executable software 1030 including instructions that, when executed, cause the processor to perform various functions described herein. In some cases, the memory 1025 may contain, among other things, a basic input/output system (BIOS) which may control basic hardware or software operation such as the interaction with peripheral components or devices.

Software 1030 may include code to implement aspects of the present disclosure. Software 1030 may be stored in a non-transitory computer-readable medium such as system memory or other memory. In some cases, the software 1030 may not be directly executable by the processor but may cause a computer (e.g., when compiled and executed) to perform functions described herein.

Transceiver 1035 may communicate bi-directionally, via one or more antennas, wired, or wireless links as described above. For example, the transceiver 1035 may represent a wireless transceiver and may communicate bi-directionally with another wireless transceiver. The transceiver 1035 may also include a modem to modulate the packets and provide the modulated packets to the antennas for transmission, and to demodulate packets received from the antennas.

In some cases, the wireless device may include a single antenna 1040. However, in some cases the device may have more than one antenna 1040, which may be capable of concurrently transmitting or receiving multiple wireless transmissions.

I/O controller 1045 may manage input and output signals for device 1005. I/O controller 1045 may also manage peripherals not integrated into device 1005. In some cases, I/O controller 1045 may represent a physical connection or port to an external peripheral. In some cases, I/O controller 1045 may utilize an operating system such as iOS®, ANDROID®, MS-DOS®, MS-WINDOWS®, OS/2®, UNIX®, LINUX®, or another known operating system. In other cases, I/O controller 1045 may represent or interact with a modem, a keyboard, a mouse, a touchscreen, or a similar device. In some cases, I/O controller 1045 may be implemented as part of a processor. In some cases, a user may interact with device 1005 via I/O controller 1045 or via hardware components controlled by I/O controller 1045.

Figure 11:
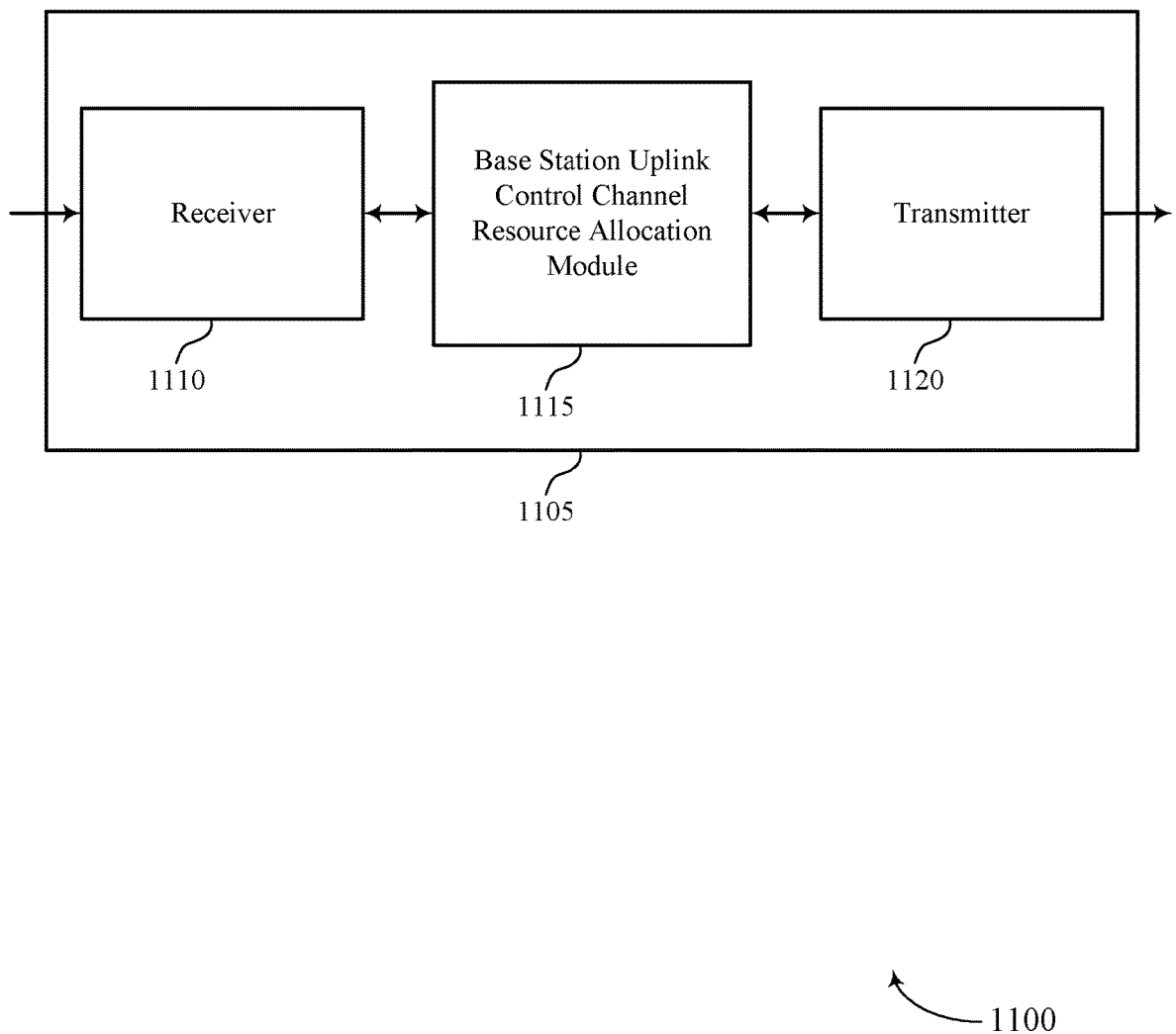
FIGS. 11 through 13 show block diagrams of a device that supports uplink control channel resource allocation in accordance with aspects of the present disclosure.

FIG. 11 shows a block diagram 1100 of a wireless device 1105 in accordance with aspects of the present disclosure. Wireless device 1105 may be an example of aspects of a base station 105 as described herein. Wireless device 1105 may include receiver 1110, base station uplink control channel resource allocation module 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, etc.). Information may be passed on to other components of the device. The receiver 1110 may be an example of aspects of the transceiver 1435 described with reference to FIG. 14. The receiver 1110 may utilize a single antenna or a set of antennas.

Base station uplink control channel resource allocation module 1115 may be an example of aspects of the base station uplink control channel resource allocation module 1415 described with reference to FIG. 14.

Base station uplink control channel resource allocation module 1115 and/or at least some of its various sub-components may be implemented in hardware, software executed by a processor, firmware, or any combination thereof. If implemented in software executed by a processor, the functions of the base station uplink control channel resource allocation module 1115 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The base station uplink control channel resource allocation module 1115 and/or at least some of its various sub-components may be physically located at various positions, including being distributed such that portions of functions are implemented at different physical locations by one or more physical devices. In some examples, base station uplink control channel resource allocation module 1115 and/or at least some of its various sub-components may be a separate and distinct component in accordance with various aspects of the present disclosure. In other examples, base station uplink control channel resource allocation module 1115 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station uplink control channel resource allocation module 1115 may identify an uplink control channel resource for allocation, determine a set of resource indicator bits based on the identified uplink control channel resource, select one or more CCEs for transmission, where a first CCE of the one or more CCEs and the set of resource indicator bits indicate the uplink control channel resource, and transmit the set of resource indicator bits in the one or more CCEs.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1435 described with reference to FIG. 14. The transmitter 1120 may utilize a single antenna or a set of antennas.

Figure 12:
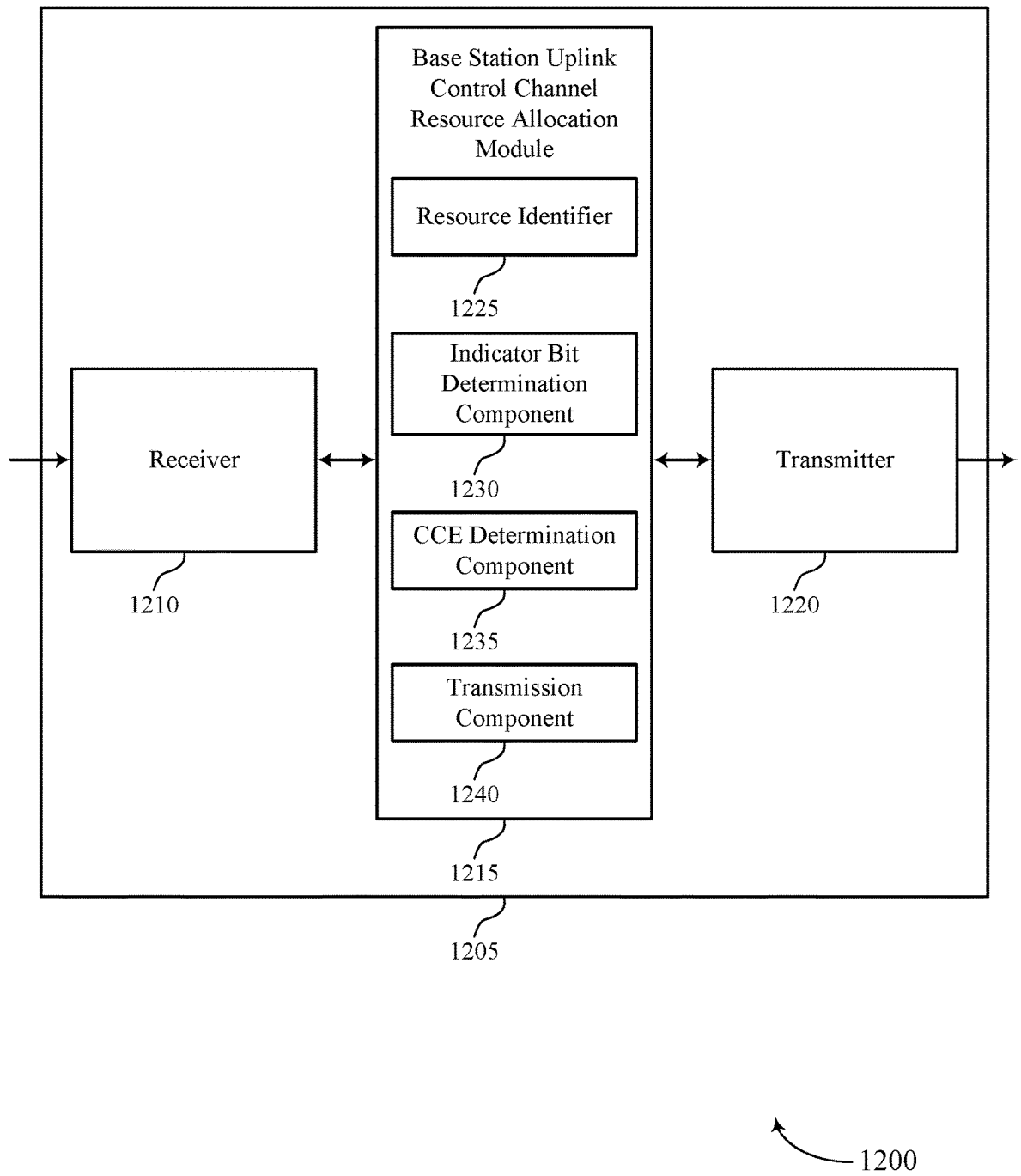

FIG. 12 shows a block diagram 1200 of a wireless device 1205 in accordance with aspects of the present disclosure. Wireless device 1205 may be an example of aspects of a wireless device 1105 or a base station 105 as described with reference to FIG. 11. Wireless device 1205 may include receiver 1210, base station uplink control channel resource allocation module 1215, and transmitter 1220. Wireless device 1205 may also include a processor. Each of these components may be in communication with one another (e.g., via one or more buses).

Receiver 1210 may receive information such as packets, user data, or control information associated with various information channels (e.g., control channels, data channels, etc.). Information may be passed on to other components of the device. The receiver 1210 may be an example of aspects of the transceiver 1435 described with reference to FIG. 14. The receiver 1210 may utilize a single antenna or a set of antennas.

Base station uplink control channel resource allocation module 1215 may be an example of aspects of the base station uplink control channel resource allocation module 1415 described with reference to FIG. 14. Base station uplink control channel resource allocation module 1215 may also include resource identifier 1225, indicator bit determination component 1230, CCE determination component 1235, and transmission component 1240.

Resource identifier 1225 may identify an uplink control channel resource for allocation and identify a second uplink control channel resource for allocation. In some cases, the uplink control channel resource includes a PUCCH resource.

Indicator bit determination component 1230 may determine a set of resource indicator bits based on the identified uplink control channel resource. In some cases, the set of resource indicator bits includes a set of ARI bits.

CCE determination component 1235 may select one or more CCEs for transmission, where a first CCE of the one or more CCEs and the set of resource indicator bits indicate the uplink control channel resource. In some cases, the first CCE of the one or more CCEs includes an initial CCE for the downlink grant or the uplink grant.

Transmission component 1240 may transmit the set of resource indicator bits in the one or more CCEs. In some cases, the set of resource indicator bits is transmitted in a downlink grant or an uplink grant.

Transmitter 1220 may transmit signals generated by other components of the device. In some examples, the transmitter 1220 may be collocated with a receiver 1210 in a transceiver module. For example, the transmitter 1220 may be an example of aspects of the transceiver 1435 described with reference to FIG. 14. The transmitter 1220 may utilize a single antenna or a set of antennas.

Figure 13:
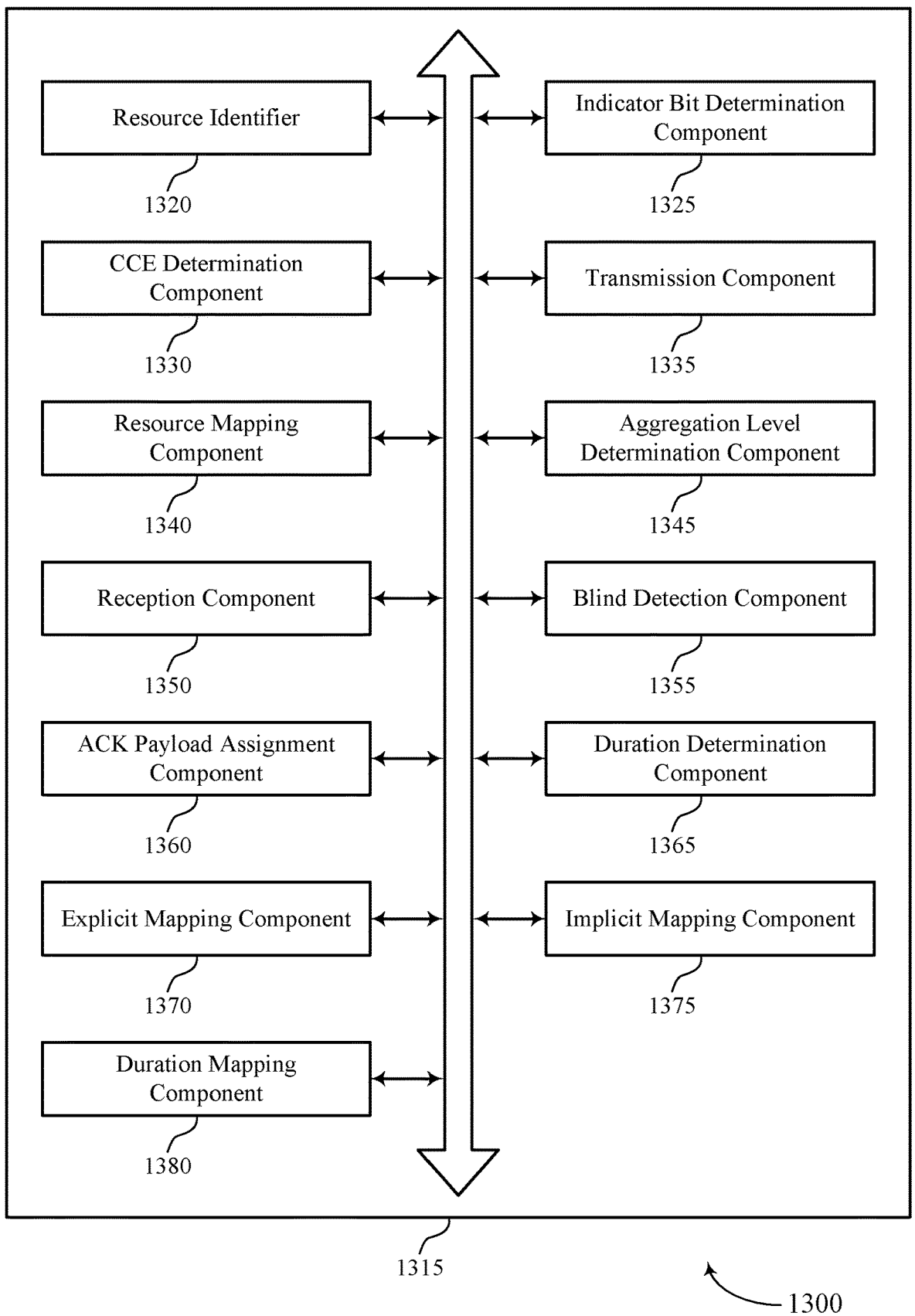

FIG. 13 shows a block diagram 1300 of a base station uplink control channel resource allocation module 1315 in accordance with aspects of the present disclosure. The base station uplink control channel resource allocation module 1315 may be an example of aspects of a base station uplink control channel resource allocation module 1415 described with reference to FIGS. 11, 12, and 14. The base station uplink control channel resource allocation module 1315 may include resource identifier 1320, indicator bit determination component 1325, CCE determination component 1330, transmission component 1335, resource mapping component 1340, aggregation level determination component 1345, reception component 1350, blind detection component 1355, ACK payload assignment component 1360, duration determination component 1365, explicit mapping component 1370, implicit mapping component 1375, and duration mapping component 1380. Each of these modules may communicate, directly or indirectly, with one another (e.g., via one or more buses).

Resource identifier 1320 may identify an uplink control channel resource for allocation and identify a second uplink control channel resource for allocation. In some cases, the uplink control channel resource includes a PUCCH resource.

Indicator bit determination component 1325 may determine a set of resource indicator bits based on the identified uplink control channel resource. In some cases, the set of resource indicator bits includes a set of ARI bits.

CCE determination component 1330 may select one or more CCEs for transmission, where a first CCE of the one or more CCEs and the set of resource indicator bits indicate the uplink control channel resource. In some cases, the first CCE of the one or more CCEs includes an initial CCE for the downlink grant or the uplink grant.

Transmission component 1335 may transmit the set of resource indicator bits in the one or more CCEs. In some cases, the set of resource indicator bits is transmitted in a downlink grant or an uplink grant.

Resource mapping component 1340 may include techniques or rules for mapping the set of resource indicator bits and the first CCE to the uplink control channel resource. In some cases, the set of resource indicator bits indicates an uplink control channel resource set, and the first CCE indicates a relative uplink control channel resource index within the uplink control channel resource set. In some cases, the first CCE indicates an uplink control channel resource set, and the set of resource indicator bits indicates a relative uplink control channel resource index within the uplink control channel resource set. In some cases, the set of resource indicator bits indicates an offset value, and a combination of the first CCE and the offset value indicates the uplink control channel resource.

Aggregation level determination component 1345 may select an aggregation level, where the aggregation level, the first CCE of the one or more CCEs, and the set of resource indicator bits indicate the uplink control channel resource and transmit the set of resource indicator bits in the one or more CCEs based on the selected aggregation level.

Reception component 1350 may receive UCI over the uplink control channel resource, where the UCI includes an ACK payload. Blind detection component 1355 may perform a blind detection process on one or more uplink control channel resources, where the UCI is received based on the blind detection process.

ACK payload assignment component 1360 may transmit a set of assignment index bits in DCI, where the set of assignment index bits indicates an ACK payload size. In some cases, a format of the DCI indicates a number of assignment index bits to include in the set of assignment index bits.

Duration determination component 1365 may select either a short uplink control channel transmission or a long uplink control channel transmission for the allocation and determine the set of resource indicator bits further based on the selected short uplink control channel transmission or long uplink control channel transmission.

Explicit mapping component 1370 may determine a second set of resource indicator bits based on the identified second uplink control channel resource, where the second set of resource indicator bits indicates the second uplink control channel resource.

Implicit mapping component 1375 may select a second set of CCEs for transmission, where a CCE of the second set of CCEs indicates the second uplink control channel resource.

Duration mapping component 1380 may determine at least one resource indicator bit, where the at least one resource indicator bit indicates either a short uplink control channel transmission or a long uplink control channel transmission for the second uplink control channel resource.

Figure 14:
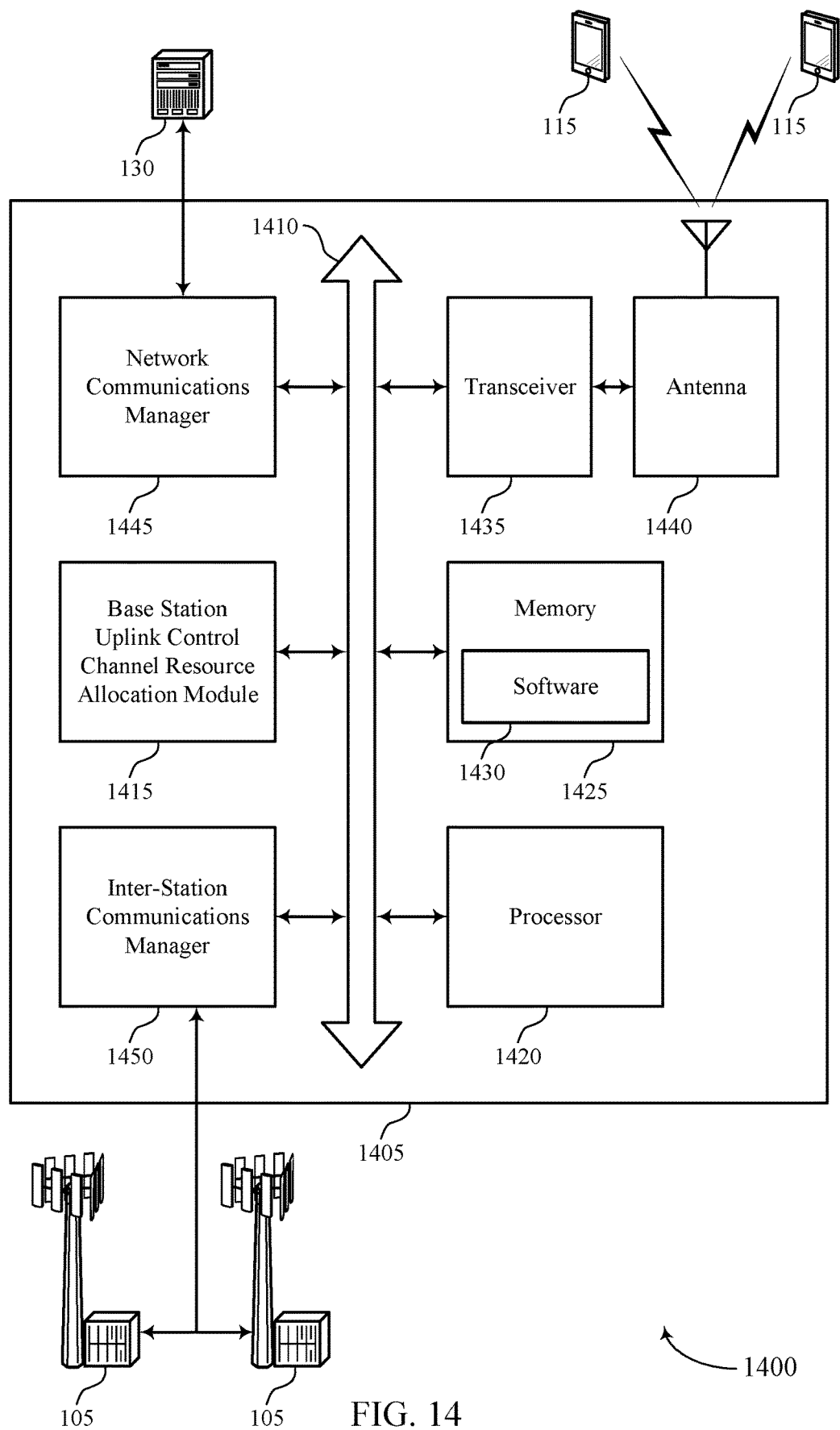
FIG. 14 illustrates a block diagram of a system including a device in accordance with aspects of the present disclosure.

FIG. 14 shows a block diagram of a system 1400 including a device 1405 in accordance with aspects of the present disclosure. Device 1405 may be an example of or include the components of base station 105 as described above, e.g., with reference to FIG. 1. Device 1405 may include components for bi-directional voice and data communications including components for transmitting and receiving communications, including base station uplink control channel resource allocation module 1415, processor 1420, memory 1425, software 1430, transceiver 1435, antenna 1440, network communications manager 1445, and inter-station communications manager 1450. These components may be in electronic communication via one or more buses (e.g., bus 1410). Device 1405 may communicate wirelessly with one or more UEs 115.

Processor 1420 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof).

In some cases, processor 1420 may be configured to operate a memory array using a memory controller. In other cases, a memory controller may be integrated into processor 1420. Processor 1420 may be configured to execute computer-readable instructions stored in a memory to perform various functions or tasks.

Memory 1425 may include RAM and ROM. The memory 1425 may store computer-readable, computer-executable software 1430 including instructions that, when executed, cause the processor to perform various functions described herein. In some cases, the memory 1425 may contain, among other things, a BIOS which may control basic hardware or software operation such as the interaction with peripheral components or devices.

Software 1430 may include code to implement aspects of the present disclosure, including code to support uplink control channel resource allocation. Software 1430 may be stored in a non-transitory computer-readable medium such as system memory or other memory. In some cases, the software 1430 may not be directly executable by the processor but may cause a computer (e.g., when compiled and executed) to perform functions described herein.

Transceiver 1435 may communicate bi-directionally, via one or more antennas, wired, or wireless links as described above. For example, the transceiver 1435 may represent a wireless transceiver and may communicate bi-directionally with another wireless transceiver. The transceiver 1435 may also include a modem to modulate the packets and provide the modulated packets to the antennas for transmission, and to demodulate packets received from the antennas.

In some cases, the wireless device may include a single antenna 1440. However, in some cases the device may have more than one antenna 1440, which may be capable of concurrently transmitting or receiving multiple wireless transmissions.

Network communications manager 1445 may manage communications with the core network 130 (e.g., via one or more wired backhaul links). For example, the network communications manager 1445 may manage the transfer of data communications for client devices, such as one or more UEs 115.

Inter-station communications manager 1450 may manage communications with other base station 105 and may include a controller or scheduler for controlling communications with UEs 115 in cooperation with other base stations 105. For example, the inter-station communications manager 1450 may coordinate scheduling for transmissions to UEs 115 for various interference mitigation techniques such as beamforming or joint transmission. In some examples, inter-station communications manager 1450 may provide an X2 interface within an LTE/LTE-A wireless communication network technology to provide communication between base stations 105.

Figure 15:
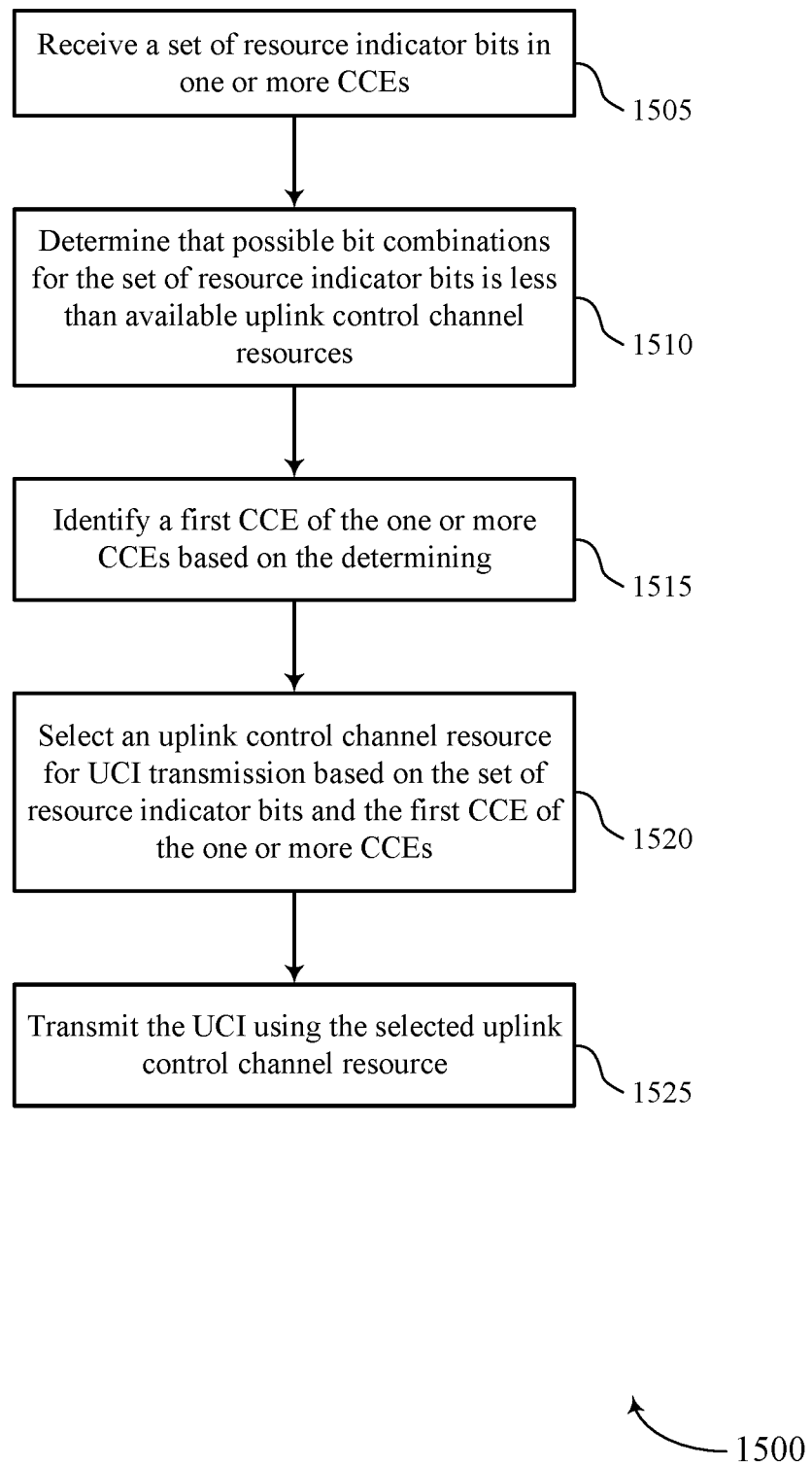
FIGS. 15 through 17 show flowcharts illustrating methods for uplink control channel resource allocation in accordance with aspects of the present disclosure.

FIG. 15 shows a flowchart illustrating a method 1500 for uplink control channel resource allocation in accordance with aspects of the present disclosure. The operations of method 1500 may be implemented by a UE 115 or its components as described herein. For example, the operations of method 1500 may be performed by a UE uplink control channel resource allocation module as described with reference to FIGS. 7 through 10. In some examples, a UE 115 may execute a set of codes to control the functional elements of the device to perform the functions described below. Additionally or alternatively, the UE 115 may perform aspects of the functions described below using special-purpose hardware.

At 1505 the UE 115 may receive a set of resource indicator bits in one or more CCEs. The operations of 1505 may be performed according to the methods described herein. In certain examples, aspects of the operations of 1505 may be performed by a reception component as described with reference to FIGS. 7 through 10.

At 1510 the UE 115 may determine that possible bit combinations for the set of resource indicator bits is less than available uplink control channel resources. The operations of 1510 may be performed according to the methods described herein. In certain examples, aspects of the operations of 1510 may be performed by an implicit relationship identifier as described with reference to FIGS. 7 through 10.

At 1515 the UE 115 may identify a first CCE of the one or more CCEs based at least in part on the determining. The operations of 1515 may be performed according to the methods described herein. In certain examples, aspects of the operations of 1515 may be performed by an implicit relationship identifier as described with reference to FIGS. 7 through 10.

At 1520 the UE 115 may select an uplink control channel resource for UCI transmission based at least in part on the set of resource indicator bits and the first CCE of the one or more CCEs. The operations of 1520 may be performed according to the methods described herein. In certain examples, aspects of the operations of 1520 may be performed by a resource mapping component as described with reference to FIGS. 7 through 10.

At 1525 the UE 115 may transmit the UCI using the selected uplink control channel resource. The operations of 1525 may be performed according to the methods described herein. In certain examples, aspects of the operations of 1525 may be performed by a UCI transmission component as described with reference to FIGS. 7 through 10.

Figure 16:
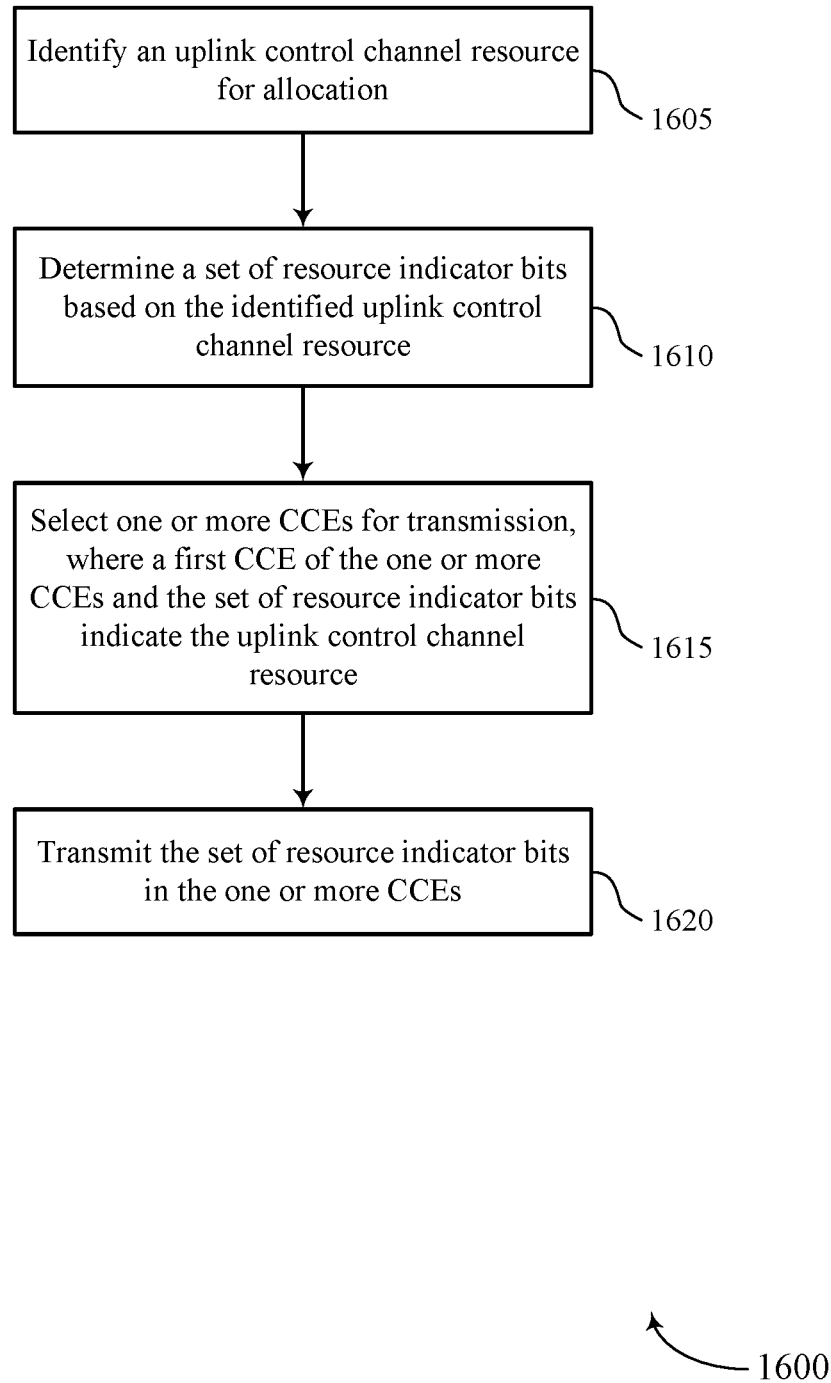

FIG. 16 shows a flowchart illustrating a method 1600 for uplink control channel resource allocation in accordance with aspects of the present disclosure. The operations of method 1600 may be implemented by a base station 105 or its components as described herein. For example, the operations of method 1600 may be performed by a base station uplink control channel resource allocation module as described with reference to FIGS. 11 through 14. In some examples, a base station 105 may execute a set of codes to control the functional elements of the device to perform the functions described below. Additionally or alternatively, the base station 105 may perform aspects of the functions described below using special-purpose hardware.

At 1605 the base station 105 may identify an uplink control channel resource for allocation. The operations of 1605 may be performed according to the methods described herein. In certain examples, aspects of the operations of 1605 may be performed by a resource identifier as described with reference to FIGS. 11 through 14.

At 1610 the base station 105 may determine a set of resource indicator bits based at least in part on the identified uplink control channel resource. The operations of 1610 may be performed according to the methods described herein. In certain examples, aspects of the operations of 1610 may be performed by an indicator bit determination component as described with reference to FIGS. 11 through 14.

At 1615 the base station 105 may select one or more CCEs for transmission, where a first CCE of the one or more CCEs and the set of resource indicator bits indicate the uplink control channel resource. The operations of 1615 may be performed according to the methods described herein. In certain examples, aspects of the operations of 1615 may be performed by a CCE determination component as described with reference to FIGS. 11 through 14.

At 1620 the base station 105 may transmit the set of resource indicator bits in the one or more CCEs. The operations of 1620 may be performed according to the methods described herein. In certain examples, aspects of the operations of 1620 may be performed by a transmission component as described with reference to FIGS. 11 through 14.

Figure 17:
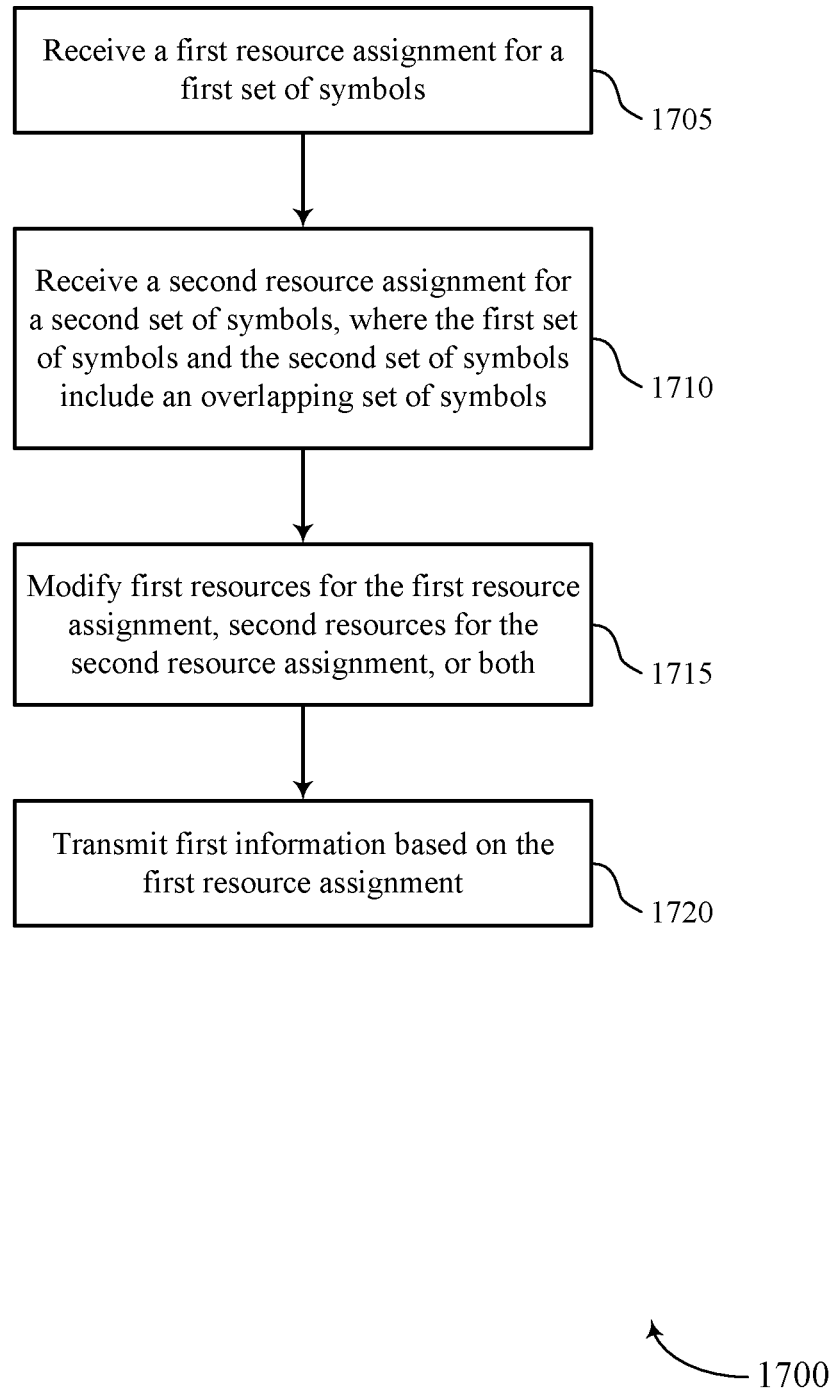

FIG. 17 shows a flowchart illustrating a method 1700 for assigned resource collision handling in accordance with aspects of the present disclosure. The operations of method 1700 may be implemented by a UE 115 or its components as described herein. For example, the operations of method 1700 may be performed by a UE uplink control channel resource allocation module as described with reference to FIGS. 7 through 10. In some examples, a UE 115 may execute a set of codes to control the functional elements of the device to perform the functions described below. Additionally or alternatively, the UE 115 may perform aspects of the functions described below using special-purpose hardware.

At 1705 the UE 115 may receive a first resource assignment for a first set of symbols. The operations of 1705 may be performed according to the methods described herein. In certain examples, aspects of the operations of 1705 may be performed by a resource assignment component as described with reference to FIGS. 7 through 10.

At 1710 the UE 115 may receive a second resource assignment for a second set of symbols, where the first set of symbols and the second set of symbols include an overlapping set of symbols. The operations of 1710 may be performed according to the methods described herein. In certain examples, aspects of the operations of 1710 may be performed by a resource assignment component as described with reference to FIGS. 7 through 10.

At 1715 the UE 115 may modify first resources for the first resource assignment, second resources for the second resource assignment, or both. The operations of 1715 may be performed according to the methods described herein. In certain examples, aspects of the operations of 1715 may be performed by a resource modification component as described with reference to FIGS. 7 through 10.

At 1720 the UE 115 may transmit first information based at least in part on the first resource assignment. The operations of 1720 may be performed according to the methods described herein. In certain examples, aspects of the operations of 1720 may be performed by a transmission component as described with reference to FIGS. 7 through 10.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, UTRA, etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple CCs.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication, comprising:
   receiving a set of resource indicator bits in one or more control channel elements (CCEs);
   determining that possible bit combinations for the set of resource indicator bits is less than available uplink control channel resources;
   identifying a first CCE of the one or more CCEs based at least in part on the determining;
   selecting an uplink control channel resource for uplink control information (UCI) transmission based at least in part on the set of resource indicator bits and the first CCE of the one or more CCEs; and
   transmitting the UCI using the selected uplink control channel resource.

2. The method of claim 1, wherein selecting the uplink control channel resource comprises:
   determining an uplink control channel resource set based at least in part on the set of resource indicator bits; and
   determining a relative uplink control channel resource index based at least in part on the first CCE, wherein the selected uplink control channel resource corresponds to the relative uplink control channel resource index within the uplink control channel resource set.

3. The method of claim 1, wherein selecting the uplink control channel resource comprises:
   determining an uplink control channel resource set based at least in part on the first CCE; and
   determining a relative uplink control channel resource index based at least in part on the set of resource indicator bits, wherein the selected uplink control channel resource corresponds to the relative uplink control channel resource index within the uplink control channel resource set.

4. The method of claim 1, wherein selecting the uplink control channel resource comprises:

determining an offset value based at least in part on the set of resource indicator bits; and selecting the uplink control channel resource based at least in part on a combination of the first CCE and the determined offset value.

5. The method of claim 1, wherein selecting the uplink control channel resource is further based at least in part on an aggregation level.

6. The method of claim 1, further comprising:
comparing uplink control channel resource indices within an uplink control channel resource set to a threshold of resources; and
determining to select the uplink control channel resource based at least in part on an aggregation level if the uplink control channel resource indices within the uplink control channel resource set is less than the threshold of resources.

7. The method of claim 1, wherein the UCI comprises acknowledgement (ACK) bits according to an ACK payload size.

8. The method of claim 7, wherein the ACK payload size comprises a radio resource control (RRC) configured ACK payload size.

9. The method of claim 8, further comprising:
receiving a number of downlink shared channels that is less than the ACK bits according to the RRC configured ACK payload size;
inserting ACK bits of a bit value corresponding to decoded results of the downlink shared channels into an ACK payload; and
inserting ACK bits of a default bit value corresponding to non-received downlink shared channels into the ACK payload to obtain the RRC configured ACK payload size.

10. The method of claim 8, further comprising:
receiving an assignment index bit in downlink control information (DCI); and
determining whether to use the RRC configured ACK payload size based at least in part on the assignment index bit.

11. The method of claim 7, further comprising:
receiving a set of assignment index bits in downlink control information (DCI); and
determining the ACK payload size based at least in part on the set of assignment index bits.

12. The method of claim 11, wherein the DCI comprises a number of assignment index bits based at least in part on a format of the DCI.

13. The method of claim 11, wherein a full DCI format corresponds to a first number of assignment index bits and a fallback DCI format corresponds to a second number of assignment index bits that is less than the first number of assignment index bits.

14. The method of claim 7, further comprising:
receiving a first downlink control channel transmission in a first transmission time interval (TTI), a second downlink control channel transmission in a second TTI, or both; and
determining the ACK payload size, ACK bit resources, or both based at least in part on receiving the first downlink control channel transmission, the second downlink control channel transmission, or both.

15. The method of claim 1, wherein the UCI is transmitted in either a short uplink control channel transmission or a long uplink control channel transmission according to a radio resource control (RRC) configuration.

16. The method of claim 1, further comprising:
determining to transmit the UCI in either a short uplink control channel transmission or a long uplink control channel transmission based at least in part on the set of resource indicator bits.

17. The method of claim 1, further comprising:
receiving a second set of resource indicator bits in a second set of CCEs;
determining that updated possible bit combinations for the second set of resource indicator bits is equal to or greater than updated available uplink control channel resources; and
selecting a second uplink control channel resource for a second UCI transmission based at least in part on the second set of resource indicator bits, wherein selecting the second uplink control channel resource is not based at least in part on a first CCE of the second set of CCEs according to determining that the updated possible bit combinations for the second set of resource indicator bits is equal to or greater than the updated available uplink control channel resources.

18. The method of claim 1, further comprising:
receiving additional downlink control information in a second set of CCEs;
determining that the additional downlink control information comprises fewer resource indicator bits than a threshold of bits;
selecting a second uplink control channel resource for a second UCI transmission based at least in part on a CCE of the second set of CCEs, wherein selecting the second uplink control channel resource is based at least in part on determining that the additional downlink control information comprises fewer resource indicator bits than the threshold of bits; and
transmitting the second UCI using the selected second uplink control channel resource.

19. The method of claim 18, wherein:
the additional downlink control information comprises zero resource indicator bits; and
the second UCI is transmitted in either a short uplink control channel transmission or a long uplink control channel transmission according to a radio resource control (RRC) configuration.

20. The method of claim 18, wherein:
the additional downlink control information comprises at least one resource indicator bit; and
the second UCI is transmitted in either a short uplink control channel transmission or a long uplink control channel transmission based at least in part on the at least one resource indicator bit.

21. The method of claim 1, wherein:
the set of resource indicator bits is received in a downlink grant or an uplink grant; and
the first CCE of the one or more CCEs comprises an initial CCE for the downlink grant or the uplink grant.

22. The method of claim 1, wherein the uplink control channel resource comprises a physical uplink control channel (PUCCH) resource.

23. The method of claim 1, wherein the set of resource indicator bits comprises a set of acknowledgement resource indicator (ARI) bits.

24. A method for wireless communication, comprising:
identifying an uplink control channel resource for allocation;
determining a set of resource indicator bits based at least in part on the identified uplink control channel resource;

selecting one or more control channel elements (CCEs) for transmission, wherein a first CCE of the one or more CCEs and the set of resource indicator bits indicate the uplink control channel resource; and transmitting the set of resource indicator bits in the one or more CCEs.

25. The method of claim 24, wherein the set of resource indicator bits indicates an uplink control channel resource set, and the first CCE indicates a relative uplink control channel resource index within the uplink control channel resource set.

26. The method of claim 24, wherein the first CCE indicates an uplink control channel resource set, and the set of resource indicator bits indicates a relative uplink control channel resource index within the uplink control channel resource set.

27. The method of claim 24, wherein the set of resource indicator bits indicates an offset value, and a combination of the first CCE and the offset value indicates the uplink control channel resource.

28. The method of claim 24, further comprising:
selecting an aggregation level, wherein the aggregation level, the first CCE of the one or more CCEs, and the set of resource indicator bits indicate the uplink control channel resource; and
transmitting the set of resource indicator bits in the one or more CCEs based at least in part on the selected aggregation level.

29. The method of claim 24, further comprising:
receiving uplink control information (UCI) over the uplink control channel resource, wherein the UCI comprises an acknowledgement (ACK) payload.

30. The method of claim 29, further comprising:
performing a blind detection process on one or more uplink control channel resources, wherein the UCI is received based at least in part on the blind detection process.

31. The method of claim 24, further comprising:
transmitting a set of assignment index bits in downlink control information (DCI), wherein the set of assignment index bits indicates an acknowledgement (ACK) payload size.

32. The method of claim 31, wherein a format of the DCI indicates a number of assignment index bits to include in the set of assignment index bits.

33. The method of claim 31, wherein a full DCI format indicates a first number of assignment index bits to include in the set of assignment index bits and a fallback DCI format indicates a second number of assignment index bits to include in the set of assignment index bits, wherein the second number of assignment index bits is less than the first number of assignment index bits.

34. The method of claim 24, further comprising:
selecting either a short uplink control channel transmission or a long uplink control channel transmission for the allocation; and
determining the set of resource indicator bits further based at least in part on the selected short uplink control channel transmission or long uplink control channel transmission.

35. The method of claim 24, further comprising:
identifying a second uplink control channel resource for allocation.

36. The method of claim 35, further comprising:
determining a second set of resource indicator bits based at least in part on the identified second uplink control channel resource, wherein the second set of resource indicator bits indicates the second uplink control channel resource.

37. The method of claim 35, further comprising:
selecting a second set of CCEs for transmission, wherein a CCE of the second set of CCEs indicates the second uplink control channel resource.

38. The method of claim 35, further comprising:
determining at least one resource indicator bit, wherein the at least one resource indicator bit indicates either a short uplink control channel transmission or a long uplink control channel transmission for the second uplink control channel resource.

39. The method of claim 24, wherein:
the set of resource indicator bits is transmitted in a downlink grant or an uplink grant; and
the first CCE of the one or more CCEs comprises an initial CCE for the downlink grant or the uplink grant.

40. The method of claim 24, wherein the uplink control channel resource comprises a physical uplink control channel (PUCCH) resource.

41. The method of claim 24, wherein the set of resource indicator bits comprises a set of acknowledgement resource indicator (ARI) bits.

42. An apparatus for wireless communication, comprising:
means for receiving a set of resource indicator bits in one or more control channel elements (CCEs);
means for determining that possible bit combinations for the set of resource indicator bits is less than available uplink control channel resources;
means for identifying a first CCE of the one or more CCEs based at least in part on the determining;
means for selecting an uplink control channel resource for uplink control information (UCI) transmission based at least in part on the set of resource indicator bits and the first CCE of the one or more CCEs; and
means for transmitting the UCI using the selected uplink control channel resource.

43. An apparatus for wireless communication, comprising:
means for identifying an uplink control channel resource for allocation;
means for determining a set of resource indicator bits based at least in part on the identified uplink control channel resource;
means for selecting one or more control channel elements (CCEs) for transmission, wherein a first CCE of the one or more CCEs and the set of resource indicator bits indicate the uplink control channel resource; and
means for transmitting the set of resource indicator bits in the one or more CCEs.

44. An apparatus for wireless communication, comprising:
a processor;
memory in electronic communication with the processor; and
instructions stored in the memory and executable by the processor to cause the apparatus to:
receive a set of resource indicator bits in one or more control channel elements (CCEs);
determine that possible bit combinations for the set of resource indicator bits is less than available uplink control channel resources;
identify a first CCE of the one or more CCEs based at least in part on the determining;

select an uplink control channel resource for uplink control information (UCI) transmission based at least in part on the set of resource indicator bits and the first CCE of the one or more CCEs; and transmit the UCI using the selected uplink control channel resource.

45. The apparatus of claim 44, wherein the instructions to select the uplink control channel resource are executable by the processor to cause the apparatus to:

determine an uplink control channel resource set based at least in part on the set of resource indicator bits; and determine a relative uplink control channel resource index based at least in part on the first CCE, wherein the selected uplink control channel resource corresponds to the relative uplink control channel resource index within the uplink control channel resource set.

46. The apparatus of claim 44, wherein the instructions to select the uplink control channel resource are executable by the processor to cause the apparatus to:

determine an uplink control channel resource set based at least in part on the first CCE; and determine a relative uplink control channel resource index based at least in part on the set of resource indicator bits, wherein the selected uplink control channel resource corresponds to the relative uplink control channel resource index within the uplink control channel resource set.

47. The apparatus of claim 44, wherein the instructions to select the uplink control channel resource are executable by the processor to cause the apparatus to:

determine an offset value based at least in part on the set of resource indicator bits; and select the uplink control channel resource based at least in part on a combination of the first CCE and the determined offset value.

48. The apparatus of claim 44, wherein selecting the uplink control channel resource is further based at least in part on an aggregation level.

49. The apparatus of claim 44, wherein the instructions are further executable by the processor to cause the apparatus to:

compare uplink control channel resource indices within an uplink control channel resource set to a threshold of resources; and determine to select the uplink control channel resource based at least in part on an aggregation level if the uplink control channel resource indices within the uplink control channel resource set is less than the threshold of resources.

50. The apparatus of claim 44, wherein the UCI comprises acknowledgement (ACK) bits according to an ACK payload size.

51. The apparatus of claim 50, wherein the ACK payload size comprises a radio resource control (RRC) configured ACK payload size.

52. The apparatus of claim 51, wherein the instructions are further executable by the processor to cause the apparatus to:

receive a number of downlink shared channels that is less than the ACK bits according to the RRC configured ACK payload size;

insert ACK bits of a bit value corresponding to decoded results of the downlink shared channels into an ACK payload; and insert ACK bits of a default bit value corresponding to non-received downlink shared channels into the ACK payload to obtain the RRC configured ACK payload size.

53. The apparatus of claim 51, wherein the instructions are further executable by the processor to cause the apparatus to:

receive an assignment index bit in downlink control information (DCI); and determine whether to use the RRC configured ACK payload size based at least in part on the assignment index bit.

54. The apparatus of claim 53, wherein a full DCI format corresponds to a first number of assignment index bits and a fallback DCI format corresponds to a second number of assignment index bits that is less than the first number of assignment index bits.

55. The apparatus of claim 50, wherein the instructions are further executable by the processor to cause the apparatus to:

receive a set of assignment index bits in downlink control information (DCI); and determine the ACK payload size based at least in part on the set of assignment index bits.

56. The apparatus of claim 55, wherein the DCI comprises a number of assignment index bits based at least in part on a format of the DCI.

57. The apparatus of claim 50, wherein the instructions are further executable by the processor to cause the apparatus to:

receive a first downlink control channel transmission in a first transmission time interval (TTI), a second downlink control channel transmission in a second TTI, or both; and determine the ACK payload size, ACK bit resources, or both based at least in part on receiving the first downlink control channel transmission, the second downlink control channel transmission, or both.

58. The apparatus of claim 44, wherein the UCI is transmitted in either a short uplink control channel transmission or a long uplink control channel transmission according to a radio resource control (RRC) configuration.

59. The apparatus of claim 44, wherein the instructions are further executable by the processor to cause the apparatus to:

determine to transmit the UCI in either a short uplink control channel transmission or a long uplink control channel transmission based at least in part on the set of resource indicator bits.

60. The apparatus of claim 44, wherein the instructions are further executable by the processor to cause the apparatus to:

receive a second set of resource indicator bits in a second set of CCEs;

determine that updated possible bit combinations for the second set of resource indicator bits is equal to or greater than updated available uplink control channel resources; and select a second uplink control channel resource for a second UCI transmission based at least in part on the second set of resource indicator bits, wherein selecting the second uplink control channel resource is not based at least in part on a first CCE of the second set of CCEs according to determining that the updated possible bit combinations for the second set of resource indicator bits is equal to or greater than the updated available uplink control channel resources.

61. The apparatus of claim 44, wherein the instructions are further executable by the processor to cause the apparatus to:
- receive additional downlink control information in a second set of CCEs;
- determine that the additional downlink control information comprises fewer resource indicator bits than a threshold of bits;
- select a second uplink control channel resource for a second UCI transmission based at least in part on a CCE of the second set of CCEs, wherein selecting the second uplink control channel resource is based at least in part on determining that the additional downlink control information comprises fewer resource indicator bits than the threshold of bits; and
- transmit the second UCI using the selected second uplink control channel resource.

62. The apparatus of claim 61, wherein:
- the additional downlink control information comprises zero resource indicator bits; and
- the second UCI is transmitted in either a short uplink control channel transmission or a long uplink control channel transmission according to a radio resource control (RRC) configuration.

63. The apparatus of claim 61, wherein:
- the additional downlink control information comprises at least one resource indicator bit; and
- the second UCI is transmitted in either a short uplink control channel transmission or a long uplink control channel transmission based at least in part on the at least one resource indicator bit.

64. The apparatus of claim 44, wherein:
- the set of resource indicator bits is received in a downlink grant or an uplink grant; and
- the first CCE of the one or more CCEs comprises an initial CCE for the downlink grant or the uplink grant.

65. The apparatus of claim 44, wherein the uplink control channel resource comprises a physical uplink control channel (PUCCH) resource.

66. The apparatus of claim 44, wherein the set of resource indicator bits comprises a set of acknowledgement resource indicator (ARI) bits.

67. An apparatus for wireless communication, comprising:
- a processor;
- memory in electronic communication with the processor; and
- instructions stored in the memory and executable by the processor to cause the apparatus to:
  - identify an uplink control channel resource for allocation;
  - determine a set of resource indicator bits based at least in part on the identified uplink control channel resource;
  - select one or more control channel elements (CCEs) for transmission, wherein a first CCE of the one or more CCEs and the set of resource indicator bits indicate the uplink control channel resource; and
  - transmit the set of resource indicator bits in the one or more CCEs.

68. The apparatus of claim 67, wherein the set of resource indicator bits indicates an uplink control channel resource set, and the first CCE indicates a relative uplink control channel resource index within the uplink control channel resource set.

69. The apparatus of claim 67, wherein the first CCE indicates an uplink control channel resource set, and the set of resource indicator bits indicates a relative uplink control channel resource index within the uplink control channel resource set.

70. The apparatus of claim 67, wherein the set of resource indicator bits indicates an offset value, and a combination of the first CCE and the offset value indicates the uplink control channel resource.

71. The apparatus of claim 67, wherein the instructions are further executable by the processor to cause the apparatus to:
- select an aggregation level, wherein the aggregation level, the first CCE of the one or more CCEs, and the set of resource indicator bits indicate the uplink control channel resource; and
- transmit the set of resource indicator bits in the one or more CCEs based at least in part on the selected aggregation level.

72. The apparatus of claim 67, wherein the instructions are further executable by the processor to cause the apparatus to:
- receive uplink control information (UCI) over the uplink control channel resource, wherein the UCI comprises an acknowledgement (ACK) payload.

73. The apparatus of claim 72, wherein the instructions are further executable by the processor to cause the apparatus to:
- perform a blind detection process on one or more uplink control channel resources, wherein the UCI is received based at least in part on the blind detection process.

74. The apparatus of claim 73, wherein a full DCI format indicates a first number of assignment index bits to include in the set of assignment index bits and a fallback DCI format indicates a second number of assignment index bits to include in the set of assignment index bits, wherein the second number of assignment index bits is less than the first number of assignment index bits.

75. The apparatus of claim 67, wherein the instructions are further executable by the processor to cause the apparatus to:
- transmit a set of assignment index bits in downlink control information (DCI), wherein the set of assignment index bits indicates an acknowledgement (ACK) payload size.

76. The apparatus of claim 75, wherein a format of the DCI indicates a number of assignment index bits to include in the set of assignment index bits.

77. The apparatus of claim 67, wherein the instructions are further executable by the processor to cause the apparatus to:
- select either a short uplink control channel transmission or a long uplink control channel transmission for the allocation; and
- determine the set of resource indicator bits further based at least in part on the selected short uplink control channel transmission or long uplink control channel transmission.

78. The apparatus of claim 67, wherein the instructions are further executable by the processor to cause the apparatus to:
- identify a second uplink control channel resource for allocation.

79. The apparatus of claim 78, wherein the instructions are further executable by the processor to cause the apparatus to:
- determine a second set of resource indicator bits based at least in part on the identified second uplink control channel resource, wherein the second set of resource indicator bits indicates the second uplink control channel resource.

80. The apparatus of claim 78, wherein the instructions are further executable by the processor to cause the apparatus to:
    select a second set of CCEs for transmission, wherein a CCE of the second set of CCEs indicates the second uplink control channel resource.

81. The apparatus of claim 78, wherein the instructions are further executable by the processor to cause the apparatus to:
    determine at least one resource indicator bit, wherein the at least one resource indicator bit indicates either a short uplink control channel transmission or a long uplink control channel transmission for the second uplink control channel resource.

82. The apparatus of claim 67, wherein:
    the set of resource indicator bits is transmitted in a downlink grant or an uplink grant; and
    the first CCE of the one or more CCEs comprises an initial CCE for the downlink grant or the uplink grant.

83. The apparatus of claim 67, wherein the uplink control channel resource comprises a physical uplink control channel (PUCCH) resource.

84. The apparatus of claim 67, wherein the set of resource indicator bits comprises a set of acknowledgement resource indicator (ARI) bits.

85. A non-transitory computer-readable medium storing code for wireless communication, the code comprising instructions executable by a processor to:
    receive a set of resource indicator bits in one or more control channel elements (CCEs);
    determine that possible bit combinations for the set of resource indicator bits is less than available uplink control channel resources;
    identify a first CCE of the one or more CCEs based at least in part on the determining;
    select an uplink control channel resource for uplink control information (UCI) transmission based at least in part on the set of resource indicator bits and the first CCE of the one or more CCEs; and
    transmit the UCI using the selected uplink control channel resource.

86. A non-transitory computer-readable medium storing code for wireless communication, the code comprising instructions executable by a processor to:
    identify an uplink control channel resource for allocation;
    determine a set of resource indicator bits based at least in part on the identified uplink control channel resource;
    select one or more control channel elements (CCEs) for transmission, wherein a first CCE of the one or more CCEs and the set of resource indicator bits indicate the uplink control channel resource; and
    transmit the set of resource indicator bits in the one or more CCEs.

* * * * *